US009713315B2

(12) United States Patent
Sweetman

(10) Patent No.: US 9,713,315 B2
(45) Date of Patent: Jul. 25, 2017

(54) RECONFIGURABLE CAT LITTER BOX AND METHOD OF MANUFACTURING SAME

(71) Applicant: Robert Sweetman, Staten Island, NY (US)

(72) Inventor: Robert Sweetman, Staten Island, NY (US)

( * ) Notice: Subject to any disclaimer, the term of this patent is extended or adjusted under 35 U.S.C. 154(b) by 324 days.

(21) Appl. No.: 14/070,526

(22) Filed: Nov. 2, 2013

(65) Prior Publication Data
US 2015/0122189 A1    May 7, 2015

(51) Int. Cl.
*A01K 1/01* (2006.01)

(52) U.S. Cl.
CPC .................. *A01K 1/0107* (2013.01)

(58) Field of Classification Search
CPC .... A01K 1/011; A01K 1/0107; A01K 1/0125; A01K 1/0114; A01K 1/0236; A01K 1/0245; A01K 1/03; A01K 1/032; A01K 1/033; A01K 1/034; A01K 1/035
USPC .................. 119/161, 165, 168, 179; 294/179
See application file for complete search history.

(56) References Cited

U.S. PATENT DOCUMENTS

| | | | | |
|---|---|---|---|---|
| 3,735,735 A | * | 5/1973 | Noroian | A01K 1/0107 119/165 |
| 3,831,557 A | * | 8/1974 | Elesh | A01K 1/0107 119/170 |
| 4,788,935 A | * | 12/1988 | Bella | A01K 1/0125 119/168 |
| 4,807,808 A | * | 2/1989 | Reed | A01K 1/033 119/168 |
| 4,913,091 A | * | 4/1990 | O'Connor | A01K 1/0107 119/168 |
| 5,044,325 A | * | 9/1991 | Miksitz | A01K 1/033 119/165 |
| 5,134,974 A | * | 8/1992 | Houser | A01K 1/0107 119/165 |
| 5,140,948 A | * | 8/1992 | Roberts | A01K 1/0047 119/165 |
| 5,148,768 A | * | 9/1992 | Hinton | A01K 1/033 119/482 |

(Continued)

FOREIGN PATENT DOCUMENTS

| | | | | | |
|---|---|---|---|---|---|
| AU | WO 2007006082 A1 | * | 1/2007 | .......... | A01K 1/0107 |
| CA | 2189171 A1 | * | 4/1998 | .......... | A01K 1/0107 |

(Continued)

*Primary Examiner* — Timothy D Collins
*Assistant Examiner* — Morgan T Barlow
(74) *Attorney, Agent, or Firm* — Russ Weinzimmer & Associates, PC

(57) ABSTRACT

Reconfigurable cat litter box and method of manufacturing same, including a base and a cover mountable atop the base. The cover includes a hinged lid for the cat owner to access the interior of the box. The cover has a first end wall defining a first access opening and an opposing second end wall defining a second access opening for the cat. The base includes an upright blocking panel to cover the first access opening or optionally to cover the second access opening. If the first access opening is adjacent a wall or furniture, then the first access opening is blocked by the blocking panel and the cat accesses the box through the second accessing opening. If the second opening is adjacent a wall or furniture, then the second access opening is blocked by the blocking panel and the cat accesses the box through the first accessing opening.

8 Claims, 24 Drawing Sheets

(56) References Cited

U.S. PATENT DOCUMENTS

| | | | | |
|---|---|---|---|---|
| 5,357,900 A * | 10/1994 | Ho | A01K 1/0245 | 119/479 |
| 5,361,725 A * | 11/1994 | Baillie | A01K 1/0107 | 119/161 |
| 5,392,733 A * | 2/1995 | Tominaga | A01K 1/0107 | 119/165 |
| 5,471,950 A * | 12/1995 | White | A01K 1/0245 | 119/165 |
| 5,572,950 A * | 11/1996 | O'Rourke | A01K 1/0107 | 119/165 |
| 5,575,238 A * | 11/1996 | Redman | A01K 1/035 | 119/165 |
| 5,598,810 A * | 2/1997 | Lawton, III | A01K 1/0114 | 119/166 |
| 5,601,052 A * | 2/1997 | Rood | A01K 1/0114 | 119/166 |
| 5,636,594 A * | 6/1997 | Pina | A01K 1/0107 | 119/165 |
| 5,775,258 A * | 7/1998 | Larsen | A01K 1/0114 | 119/161 |
| 5,785,000 A * | 7/1998 | Barbary | A01K 1/0114 | 119/166 |
| 5,794,566 A * | 8/1998 | Goetz | A01K 1/0107 | 119/161 |
| 5,806,461 A * | 9/1998 | Kiera | A01K 1/0114 | 119/165 |
| 6,039,368 A * | 3/2000 | Kowalczyk | A01K 1/0114 | 119/161 |
| 6,129,050 A * | 10/2000 | Carbajal | A01K 1/0107 | 119/165 |
| 6,457,435 B1 * | 10/2002 | Bridges | A01K 1/011 | 119/163 |
| 6,647,924 B1 * | 11/2003 | Zwicker | A01K 1/033 | 119/452 |
| 7,017,519 B1 * | 3/2006 | Deasy | A01K 1/0114 | 119/166 |
| 7,036,458 B1 * | 5/2006 | Stornant | A01K 1/011 | 119/453 |
| 7,584,720 B1 * | 9/2009 | Jackson | A01K 1/034 | 119/452 |
| 7,677,201 B1 * | 3/2010 | Eden | A01K 1/0107 | 119/165 |
| 8,336,500 B1 * | 12/2012 | Britt | | 119/472 |
| 8,539,911 B1 * | 9/2013 | Landrum | A01K 1/011 | 119/168 |
| 8,578,886 B1 * | 11/2013 | Delisle | A01K 1/0107 | 119/165 |
| 8,839,741 B2 * | 9/2014 | Cheek | A01K 1/0114 | 119/161 |
| 2002/0000205 A1 * | 1/2002 | Yamamoto | A01K 1/0114 | 119/161 |
| 2002/0139313 A1 * | 10/2002 | Mack, Jr. | A01K 1/0107 | 119/165 |
| 2003/0101943 A1 * | 6/2003 | Nicoud | B65F 1/062 | 119/161 |
| 2005/0103277 A1 * | 5/2005 | Helou | A01K 1/0125 | 119/165 |
| 2005/0172907 A1 * | 8/2005 | Sharpe | A01K 1/0121 | 119/163 |
| 2006/0005777 A1 * | 1/2006 | Galindo | A01K 1/033 | 119/165 |
| 2006/0156993 A1 * | 7/2006 | Wright | A01K 1/0107 | 119/165 |
| 2007/0051317 A1 * | 3/2007 | Bruner | A01K 1/0107 | 119/53 |
| 2007/0125308 A1 * | 6/2007 | Goldston | A01K 1/0107 | 119/165 |
| 2007/0175400 A1 * | 8/2007 | Gantt | A01K 1/011 | 119/165 |
| 2007/0215057 A1 * | 9/2007 | Geer | A01K 1/0047 | 119/165 |
| 2008/0022938 A1 * | 1/2008 | Callan | A01K 1/0107 | 119/165 |
| 2008/0022942 A1 * | 1/2008 | Chu | A01K 1/033 | 119/500 |
| 2008/0041861 A1 * | 2/2008 | Crawford | B65D 83/06 | 220/697 |
| 2008/0105207 A1 * | 5/2008 | Gloor | A01K 1/0114 | 119/161 |
| 2008/0156808 A1 * | 7/2008 | Perry | B65D 25/2897 | 220/560.03 |
| 2009/0000560 A1 * | 1/2009 | Matsuo | A01K 1/0107 | 119/168 |
| 2009/0064939 A1 * | 3/2009 | Cirincione | A01K 1/0107 | 119/161 |
| 2009/0194033 A1 * | 8/2009 | Modlin | A01K 1/0107 | 119/167 |
| 2009/0223461 A1 * | 9/2009 | Trunnell | A01K 1/0245 | 119/472 |
| 2010/0050951 A1 * | 3/2010 | Maguire | A01K 1/0107 | 119/165 |
| 2010/0132624 A1 * | 6/2010 | Ferrer | A01K 1/0047 | 119/500 |
| 2010/0308065 A1 * | 12/2010 | Vandamme | B65D 43/169 | 220/697 |
| 2011/0030619 A1 * | 2/2011 | Blackstone | A01K 1/033 | 119/527 |
| 2011/0036302 A1 * | 2/2011 | Oedekoven | A01K 1/00 | 119/500 |
| 2011/0186570 A1 * | 8/2011 | Perry | B65D 17/502 | 220/23.87 |
| 2011/0297096 A1 * | 12/2011 | Northrop | A01K 1/0107 | 119/165 |
| 2013/0160381 A1 * | 6/2013 | Sommer | A01K 1/0107 | 52/173.1 |

FOREIGN PATENT DOCUMENTS

| | | | | |
|---|---|---|---|---|
| CA | | 2408379 A1 * | 5/2004 | A01K 1/011 |
| CH | WO | 2010003794 A1 * | 1/2010 | A01K 1/0107 |
| DE | | 3500498 A1 * | 5/1986 | A01K 1/0107 |
| EP | | 1488691 A2 * | 12/2004 | A01K 1/0107 |
| FR | | 2456471 A2 * | 12/1980 | A01K 1/0107 |
| JP | WO | 2011102367 A1 * | 8/2011 | A01K 1/0107 |

* cited by examiner

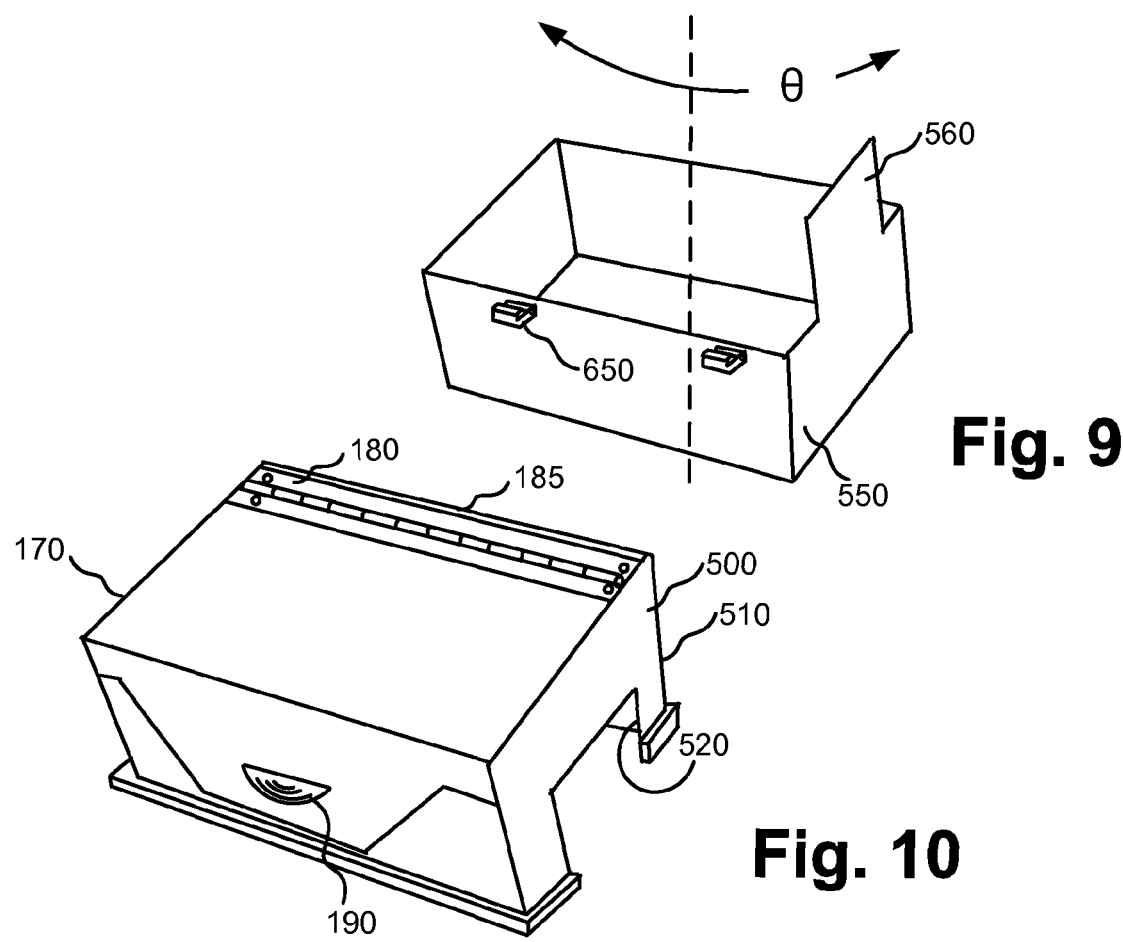

RECONFIGURABLE CAT LITTER BOX AND METHOD OF MANUFACTURING SAME

FIELD OF THE INVENTION

This invention generally relates to animal husbandry and more particularly relates to cat litter boxes.

BACKGROUND OF THE INVENTION

Cat litter boxes are used by cats for deposit of cat biological waste that includes urine and fecal matter. Contained in the litter box is cat litter that receives the cat's waste. The waste, after being deposited in the cat litter, forms clumps over time and is raked, sifted and scooped from the litter box by the cat's owner or caregiver using a litter scoop. The waste clumps are subsequently discarded.

Typically, the cat litter box is disposed at a location in a home or apartment, such that the cat litter box does not obstruct normal movement of the cat owner and others in the home or apartment. In this regard, the cat litter box is usually disposed adjacent a wall, so that the cat litter box is not in the path of the cat owner and others. In some cases, there may be only a few locations in a cramped home or apartment where the cat litter box can be placed, due to presence of furniture and other items, and still be readily accessible by the cat. The configurations of some commercially available cat litter boxes may even require rearrangement of furniture and other items in order to accommodate presence of the cat litter box, so that the cat has ready access to the cat litter box. Limiting deployment of the cat litter box in this manner and rearrangement of furniture and other items in the home, apartment or other building structure to accommodate the cat litter box inconveniences the cat owner and may even preclude the enjoyment of cat ownership. Therefore, a consideration in the art is difficulty locating the cat litter box in a space that does not easily accommodate the cat litter box.

Another consideration in the art is storage of the previously mentioned litter scoop after use in a manner that is both convenient for the cat owner or caregiver and that is sanitary. The litter scoop has perforate walls that allow unclumped cat litter to pass through the perforations while simultaneously retaining the waste clumps on the litter scoop.

Therefore, a consideration in the art is what to do with the litter scoop after using the litter scoop to rake, sift, and scoop litter clumps from the cat litter box. In this regard, the litter scoop will typically retain residual, contaminated cat litter micro-particles or debris adhering to the litter scoop after the litter scoop is used. Merely placing the litter scoop on the floor next to the cat litter box increases the risk that the contaminated litter particles will be tracked into adjacent rooms or deposited and scattered onto adjacent furniture surfaces due to human foot traffic and other human and cat activity. This is inconvenient for the cat owner or care giver because the tracked litter particles will cause the cat owner or care giver to take time to clean the cat litter tracked into adjacent rooms or deposited and scattered onto adjacent furniture surfaces. The tracked and scattered litter particles can also pose a health risk to humans. This is so because the tracked and scattered litter particles may be contaminated with bacteria (e.g., *escherichia coli*) and protozoa (e.g., *toxoplasma gondii*) that can cause or exacerbate health issues in some humans. Avoiding the need to place the litter scoop on the floor reduces the risk that contaminated litter particles will be tracked into adjacent rooms or deposited onto adjacent furniture surfaces.

Another consideration in the art is contaminated litter particles falling from the cat's paws as the cat exits the cat litter box. These particles increase the risk that the contaminated litter particles will be tracked into adjacent rooms or deposited and scattered onto adjacent furniture surfaces due to human foot traffic and other human and cat activity. The tracked and scattered litter particles falling from the cat's paws can pose a health risk to humans because the particles may be contaminated with the previously mentioned bacteria and protozoa. In addition, tracked and scattered litter particles require the cat owner or care giver to take time to clean the litter particles falling from the cat's paws and tracked and scattered outside the cat litter box.

Yet another consideration in the art is cat behavior that can cause the cat to deposit waste matter outside the litter box rather than in the cat litter box. In this regard, it has been observed that if the cat is startled or otherwise disturbed by the cat owner or care giver while the cat is defecating or urinating in the cat litter box, the cat may bolt from the cat litter box and track excrement and urine outside the cat litter box. This requires the cat owner or care giver to take time to clean the cat's waste tracked outside the cat litter box. In addition, cat waste scattered and tracked outside the cat litter box can pose a health risk to humans, as previously mentioned. Therefore, particularly in the case of covered cat litter boxes that obstruct the view of the interior of the cat litter box, it may be difficult for the cat owner or care giver to know when the cat is in the cat litter box in order to avoid startling or otherwise disturbing the cat while the cat is defecating or urinating in the cat litter box.

A further consideration in the art is offensive odor emanating from waste matter present in the cat litter that is disposed in the cat litter box. In this regard, a main component in cat urine is urea ($CH_4N_2O$) that breaks-down into ammonia ($NH_3$) and other components, thereby producing a urine-ammonia noxious smell. Ammonia is released as a volatile gas when the cat's urine decomposes. Cat feces release hydrogen sulfide ($H_2S$), in addition to other gases, that is noticed as the typical "rotten egg" smell. It is therefore desirable to substantially eliminate these noxious gases before they are released from the cat litter box.

Attempts have been made to address the considerations mentioned hereinabove with respect to cat litter boxes. For example, U.S. Pat. No. 5,623,892 titled "Hinge Assembly For Providing A Cat Litter Box With A Readily Removable Hinged Cover" issued Apr. 29, 1997 in the name of Anthony O'Rourke, et al. relates to a hinge configuration particularly adapted for providing a cat litter box with a removable hinge cover.

According to the O'Rourke, et al. patent, a hinge mechanism is provided for use on a cat litter box, which hinge mechanism allows for pivotable movement of a cover on the box and which allows the cover to be readily detached from the box. This patent states that due to space limitations in many locations where cat litter boxes are kept, it would be desirable if such a hinge mechanism provided a support for the cover in the raised position to maintain unobstructed access to the box without having to pivot the cover rearwardly of the box to the floor. The hinge allows the cover to be pivoted rearwardly, but supports the cover in a raised open position without the cover being pivoted to the floor. According to this patent, the hinge also allows for the cover to be easily detached from the litter box for cleaning and transportation. The top surface of the cover defines a pair of openings therein spanned by a plurality of transverse louvers adapted to receive air filtration elements therein to reduce odors emanating from the litter box.

However, although the O'Rourke, et al. patent discloses a hinge mechanism that provides a support for the cover in the raised position to maintain unobstructed access to the box without having to pivot the cover rearwardly of the box to the floor, the hinge mechanism appears to be located at the rear top edge of the box, thereby increasing the risk that the hinge mechanism will contact an adjacent wall and possibly mar the adjacent wall.

Another attempt to address the considerations mentioned hereinabove with respect to cat litter boxes is disclosed in U.S. Pat. No. 5,775,258 titled "Sanitation System For Cat Litter Boxes" issued Jul. 7, 1998, in the name of Knut H. Larsen. This patent relates to a sanitation system for cat litter boxes which provides for removal of cat fecal matter, continuous deodorization and ready waste disposal.

According to the Larsen patent, the sanitation system has a litter box scoop, and a removably mounted litter box disinfectant and deodorizing fluid reservoir containing a disinfectant deodorization fluid. A reservoir chamber defined by the deodorizing fluid reservoir receives the scoop region of the litter box scoop device for removable captive containment within the reservoir. The reservoir is mounted externally on the litter box.

However, although the Larsen patent discloses a reservoir chamber defined by a deodorizing fluid reservoir that receives the scoop region of a litter box scoop device, presence of the reservoir expands the outside envelope of the cat litter box and may interfere with the cat owner's unobstructed movement about the cat litter box, especially in confined spaces.

Yet another attempt to address the considerations mentioned hereinabove with respect to cat litter boxes is disclosed in U.S. Pat. No. 5,924,383 titled "Cat Litter Box Threshold" issued Jul. 20, 1999 in the name of Jason T. Smith. This patent relates to a threshold provided for a cat litter box having a side entry.

According to the Smith patent, the threshold comprises a stand supporting an elevated, level cat launching field belonging to a cat runway, a ramp having a rough litter-dislodging surface extending downwardly from the cat launching field, and a barrier for barring cats from jumping onto or off the sides of the ramp. The rough litter-dislodging surface is a grating that removes litter from the cat's paws. The litter that is removed falls through the grating to the floor of the runway. Periodically, this litter may be returned to the litter box by manually tilting and shaking the threshold.

However, although the Smith patent discloses a ramp having a litter-dislodging surface, the user must manually tilt and shake the threshold to return the litter to the litter box. Taking time and effort for the user to manually tilt and shake the threshold is inconvenient for the user and may cause soiled cat litter particles to be inadvertently scattered on the floor and other nearby surfaces.

Still another attempt to address the considerations mentioned hereinabove with respect to cat litter boxes is disclosed in U.S. Pat. No. 7,487,743 B1 titled "Cat Litter Box Apparatus" issued Feb. 10, 2009 in the name of Magnus Lane. This patent relates to a cat litter box apparatus which is covered and has self-cleaning doors for animal entry, along with a supported tilt for semi-automatic litter screening.

According to the Lane patent, the apparatus comprises a parallelepiped box having two opposed sides, a first end, a second end, and a bottom. A transparent lid, which opens pivotally about a hinge, provides an aid in viewing litter and excrement and serves as a guide for a user in determining when to service the apparatus. A cat entrance door is disposed on each of the two sides of the box.

However, although the Lane patent discloses a transparent lid that opens pivotally about a hinge and that is used as an aid in determining when to service the apparatus, the lid itself appears to pivot to the floor rather than avoid pivoting to the floor, thereby increasing the risk that litter particles will be deposited on the floor. Also, the hinges that allow the lid to pivot appear to be located at the rear edge of the apparatus, thereby increasing the risk that the hinges will contact an adjacent wall or furniture and possibly mar the adjacent wall or furniture. Also, additional space is apparently required for the lid to fully pivot to the floor. Providing for such additional space can be problematic where space is limited for deployment of the apparatus. Further, the transparent lid can allow the cat to see the cat owner or care giver when the cat is defecating or urinating in the apparatus and when the cat owner or care giver is nearby. This may increase the likelihood that the cat will become startled or otherwise disturbed by presence of the cat owner or care giver while the cat is defecating or urinating in the cat litter box, and may cause the cat to bolt from the cat litter box and track excrement and urine outside the cat litter box.

Another attempt to address the considerations mentioned hereinabove with respect to cat litter boxes is disclosed in U.S. Pat. No. 5,577,462 titled "Animal Litter Container With Litter Scoop" issued Nov. 26, 1996 in the name of Donna J. Korth. This patent relates to containers for the storage and disposal of animal litter waste which include apparatus for separating waste from reusable litter.

According to the Korth patent, the animal litter container includes two shells. The animal litter container also includes means for retaining a deodorizer on the exterior of the shells. The deodorizer retaining means can take the form of a vessel that has venting apertures extending through the sidewalls of the vessel so that the deodorizer's action can be more fully realized.

However, although the Korth patent discloses an animal litter container that includes means for retaining a deodorizer on the shells of the animal litter container, the means for retaining the deodorizer is on an exterior surface of the shells. Retaining the deodorizer on the exterior surface of the shells expands the outside envelope of the animal litter container and may interfere with the cat owner's unobstructed movement about the animal litter container, especially in confined spaces.

Although the approaches recited hereinabove disclose various configurations of cat litter boxes, the approaches recited hereinabove do not appear to disclose the invention described and claimed hereinbelow.

BRIEF SUMMARY OF THE INVENTION

The present invention addresses the shortcomings of the prior art approaches mentioned hereinabove by providing a reconfigurable cat litter box and method of manufacturing same. The cat litter box is reconfigurable in order to accommodate limited or cramped living quarters and, therefore, to provide added convenience for the cat owner or care giver.

In a first embodiment, the reconfigurable cat litter box includes a generally parallelepiped-shaped base that contains the cat litter and that has an open top end. A generally parallelepiped-shaped cover is mounted on the top end of the base. The cover includes a hinged lid allowing access to the interior of the cat litter box for removing soiled litter and for refilling the cat litter box with fresh litter. The lid includes a litter scoop holder on an underside surface of the lid for receiving a litter scoop after use, which is an alternative to placing the litter scoop on the floor after use. The cover also has an end wall defining an access opening for allowing a cat ingress into and egress from the cat litter box. In addition, the location of the hinge that allows the lid to pivot between open and closed positions never contact an adjacent wall, thereby avoiding the risk of marring the adjacent wall. This is so because the hinge is set-back from an upper, outer edge of the cover rather than being located at the upper outer edge of the cover. Also, the lid never pivots rearwardly to the floor, thereby reducing the risk that any litter particles on the lid will be deposited onto the floor. In addition, at least one latch is provided on each of the two sides of the cat litter box for releasably securing the cover to the base. Unfastening the latches and lifting the cover from the base allows access to the interior of the base for removing soiled litter and for refilling the base with fresh litter. Thus, the cover can remain fastened to the base by means of the latches and access to the interior of the base is obtained by pivoting the lid to an open position. The cat litter box is reconfigurable in the sense that the lid can remain closed and the latches can be unfastened to allow the cover to be lifted from the base to obtain access to the interior of the base for removing soiled litter and for refilling the base with fresh litter.

In a second embodiment, the reconfigurable cat litter box is similar to the first embodiment, except the lid includes a one-way transparent viewing window affixed to the lid, so that the cat owner or care giver can ascertain when the cat is present in the cat litter box. As previously mentioned, it has been observed that if the cat is startled or otherwise disturbed by the cat owner or care giver while the cat is defecating or urinating in the cat litter box, the cat may bolt from the cat litter box and track waste outside the cat litter box. In order to avoid this result, the one-way transparent viewing window allows the cat owner or care giver to ascertain when the cat is present in the cat litter box, so that the cat owner or care giver will not attempt servicing the cat litter box while the cat is present in the cat litter box. The one-way transparent viewing window is substantially opaque when viewed from inside the cat litter box and clear when viewed from outside the cat litter box. The one-way transparent viewing window allows the cat owner or care giver to view the interior of the cat litter box without the cat seeing the cat owner or care giver, thereby decreasing the risk that the cat will be startled by the nearby presence of the cat owner or care giver. The one-way transparent viewing window also allows the cat owner or care giver to determine whether the cat litter box requires servicing. Therefore, this embodiment of the invention allows the cat owner or care giver to view the interior of the cat litter box to ascertain presence of the cat in the cat litter box and to determine whether the cat litter box requires servicing.

In a third embodiment, the reconfigurable cat litter box is similar to the first embodiment, except the base defines a litter return opening through an end wall of the base for accepting litter through the litter return opening. In this regard, an access ramp assembly is disposed adjacent the access opening of the cat litter box and is adapted to remove a plurality of litter particles from the paws of the cat as the cat exits the cat litter box through the access opening. The ramp assembly includes an inclined, litter-dislodging pathway having stair steps that define gaps between adjacent steps for passage of the litter particles through the gaps as the cat traverses the pathway. A low-friction litter return slide is disposed beneath the gaps for catching the tracked litter particles passing through the gaps. An end portion of the litter return slide passes through the previously mentioned litter return opening for slidably returning the tracked litter particles along the litter return slide, through the litter return opening, and into the base. The stair steps are removable for cleaning the stair steps, when necessary. The ramp assembly also defines a storage space or compartment for storage of litter box accessory items, such as litter disposal bags that are used for placement of soiled litter therein. Thus, the ramp assembly reconfigures the cat litter box for removing soiled litter particles from the cat's paws as the cat exits the cat litter box, for allowing return of the soiled litter particles to the cat litter box, and for storage of litter box accessory items.

In a fourth embodiment, the reconfigurable cat litter box is similar to the third embodiment of the reconfigurable cat litter box, except a grate overlays the stair steps. The grate, as well as the stair steps, is removable for cleaning the grate, when necessary. The grate is provided because it has been observed that cats may sometimes prefer traversing the grate of the fourth embodiment rather than the stair steps of the third embodiment.

In a fifth embodiment, the reconfigurable cat litter box includes a dual-access cover that has a first end wall defining a first access opening and an opposed second end wall defining a second access opening. The first access opening and the second access opening allow a cat ingress into and egress from the cat litter box. However, the base includes an upright blocking panel integrally formed therewith at an end sidewall of the base. If the previously mentioned access ramp is present, the blocking panel is located opposite the side where the access ramp is located. The blocking panel is adapted (i.e., sized and shaped) to cover the first access opening or optionally to cover the second access opening. In this regard, if a home or apartment wall or if furniture interferes with access to the first access opening, the base is manually rotated through an angle phi "φ" of 180° about a centermost vertical axis passing through the base such that the first access opening is blocked by the blocking panel. Blocking the first access opening in this manner discourages the cat from attempting to enter and exit the cat litter box through the first access opening. Therefore, the cat will enter and exit the cat litter box through the second access opening. Alternatively, if a home or apartment wall or if furniture interferes with access to the second access opening, the base is manually rotated through the angle phi "φ" of 180° such that the second access opening is blocked by the blocking panel. Blocking the second access opening in this manner discourages the cat from attempting to enter and exit the cat litter box through the second access opening. Therefore, the cat will enter and exit the cat litter box through the first access opening. In either case, the cover is desirably kept stationary while the base is rotated. Reconfiguring the cat litter box by rotating the base allows the cat litter box to be disposed near virtually any wall, either perpendicularly, parallel, or at an angle with respect to the wall, and without a need to rearrange furniture or other items to accommodate presence of the cat litter box.

In a sixth embodiment, the reconfigurable cat litter box is similar to the fifth embodiment, except an access platform is disposed adjacent the first access opening for facilitating passage of the cat through the first access opening or optionally adjacent the second access opening for facilitating passage of the cat through the second access opening. If desired, the access platform may define a hollow interior therein that is accessible by means of an access door hingedly coupled to the access platform. In this case, the hollow interior of the access platform is necessarily used for storage of litter box accessory items, such as litter disposal bags that are used for placement of soiled litter therein.

In a seventh embodiment, the reconfigurable cat litter box is similar to the sixth embodiment, except the access platform is integrally formed with the base of the reconfigurable cat litter box.

In an eighth embodiment, the reconfigurable cat litter box is similar to the third embodiment, except the access ramp assembly is integrally formed with the base of the reconfigurable cat litter box.

In a ninth embodiment, the reconfigurable cat litter box is similar to the first embodiment, except the access opening is covered by a pivotable cat access door. The cat access door prevents the cat litter from being visible, which is more aesthetically desirable for some cat owners. Also, presence of the cat access door reduces unpleasant odor that would otherwise escape through the cat access opening. Further, presence of the cat access door reduces likelihood of litter scattering outside the litter box while the cat uses the litter box. In the case where the cat litter box defines two access openings, such as in the case of the fifth embodiment, the cat access door can be removed from the first access opening and placed to cover the second access opening. Similarly, the cat access door can be removed from the second access opening and placed to cover the first access opening.

In a tenth embodiment, magnets are used for keeping the hinged lid, which is built into the cover, in the closed position. Also, the previously mentioned latches are provided for connecting the cover to the base.

In an eleventh embodiment, the reconfigurable cat litter box is similar to the fifth embodiment, except a first pair of upright channels is coupled to the cover, the first pair of channels being disposed adjacent the first access opening. A second pair of upright channels is coupled to the cover, the second pair of channels being disposed adjacent the second access opening. The first pair of channels and the second pair of channels are each adapted to slidably receive a blocking wall for blocking or closing either the first access opening or the second access opening, as desired. In this regard, if a home or apartment wall or if furniture interferes with access to the first access opening, the cat owner or care giver slides the blocking wall along the first pair of channels, such that the first access opening is blocked by the blocking wall. For example, in the third embodiment, this ensures that, by rotating the base 180°, the litter return slide/ramp entrance will be on the correct or desired side of the litter box and that the hinged lid will correctly open from front to back. Blocking the first access opening in this manner discourages the cat from attempting to enter and exit the cat litter box through the first access opening. Therefore, the cat will enter and exit the cat litter box through the second access opening. Alternatively, if a home or apartment wall or if furniture interferes with access to the second access opening, the cat owner or care giver slides the blocking wall along the second pair of channels, such that the second access opening is blocked by the blocking wall. Blocking the second access opening in this manner discourages the cat from attempting to enter and exit the cat litter box through the second access opening. Therefore, the cat will enter and exit the cat litter box through the first access opening. Reconfiguring the cat litter box by means of the blocking wall allows the cat litter box to be disposed near virtually any wall, either perpendicularly, parallel, or at an angle with respect to the wall, and without a need to rearrange furniture or other items to accommodate presence of the cat litter box.

It will be appreciated that the embodiments disclosed herein are not necessarily mutually exclusive. For example, the one-way transparent viewing window that is disposed in the lid of the second embodiment litter box can be used with the fourth embodiment litter box, as well.

According to an aspect of the present invention, there is provided a reconfigurable cat litter box, including: a base adapted to contain cat litter therein; a cover adapted to be mounted atop the base, the cover having an open top end and an upper edge, the cover having an end wall defining an access opening; a hinge coupled to the cover and set-back from the upper edge; and a lid pivotally coupled to the hinge for opening and closing the open top end of the cover, the lid having an underside surface.

According to another aspect of the present invention, there is provided a reconfigurable cat litter box, including: a base adapted to contain cat litter therein; a cover adapted to be mounted atop the base, the cover having an open top end and an upper edge, the cover having a first end wall defining a first access opening and a second end wall defining a second access opening; a hinge coupled to the cover and set-back from the upper edge; and a lid pivotally coupled to the hinge for opening and closing the open top end of the cover, the lid having an underside surface.

According to another aspect of the present invention, there is provided a reconfigurable cat litter box, including: a base adapted to contain cat litter therein, the base having an upper perimeter; a cover adapted to be mounted atop the base, the cover having an open top end and an upper edge, the cover having a back-chamfered flange therearound configured to engage the upper perimeter of the base for positioning the cover on the base, the cover having a first end wall defining a first access opening and a second end wall defining a second access opening, the first access opening and the second access opening being sized for ingress and egress of a cat therethrough; a hinge coupled to the cover and set-back from the upper edge; a lid pivotally coupled to the hinge for opening and closing the open top end of the cover, the lid having an underside surface; and a removable litter scoop holder coupled to the underside surface of the lid for releasably holding a litter scoop therein.

According to yet another aspect of the present invention there is provided a method of manufacturing a reconfigurable cat litter box, including the steps of: providing a base adapted to contain cat litter therein; providing a cover adapted to be mounted atop the base and having an open top end, the cover having a first end wall defining a first access opening and a second end wall defining a second access opening; and pivotally coupling a hinged lid to the cover for opening and closing the upper top end of the cover.

A feature of the present invention is the provision of a cover adapted to be mounted atop a base and a lid pivotally connected to the cover by means of a hinge, the lid having an underside surface for coupling a litter scoop holder thereto.

Another feature of the present invention is the provision of a cover adapted to be mounted atop the base, the cover having a first end wall defining a first access opening and a second end wall defining a second access opening, the base including an upright blocking panel adapted to cover the first access opening or optionally to cover the second access opening.

Another feature of the present invention is the provision of an access platform adapted to be disposed adjacent the first access opening or optionally adjacent the second access opening for facilitating cat ingress into and egress from the cat litter box.

An additional feature of the present invention is the provision of the access platform integrally formed with the base.

A further feature of the present invention is the provision of an access ramp assembly connected to the base as one assembly with two openings in the cover, one opening being blocked when the cover and base are united, the access ramp assembly adapted to be disposed adjacent the first access opening or optionally adjacent the second access opening for removal of litter particles from the paws of the cat as the cat exits the cat litter box.

Another feature of the present invention is the provision of the access ramp assembly integrally formed with the base.

Yet another feature of the present invention is the provision of a cover and a lid pivotally hinged to the cover, the lid defining a vent therethrough.

Still another feature of the present invention is the provision of a deodorizer support coupled to an underside surface of the lid and aligned with the vent for supporting a deodorizer in communication with the vent.

Another feature of the present invention is the provision of a cover having a lid including a one-way transparent viewing window for the cat owner or care giver to ascertain presence of the cat in the cat litter box without the cat seeing the cat owner or care giver.

A further feature of the present invention is the provision of a first pair of upright channels coupled to the cover adjacent to the first access opening and a second pair of upright channels coupled to the cover adjacent to the second access opening, the first pair of channels and the second pair of channels each being adapted to slidably receive a blocking wall for blocking either the first access opening or the second access opening, respectively.

In addition to the foregoing, various other method and/or device aspects and features are set forth and described in the teachings, such as text (e.g., claims and/or detailed description) and/or drawings of the present invention.

The foregoing is a summary and thus may contain simplifications, generalizations, inclusions, and/or omissions of detail. Consequently, those skilled in the art will appreciate that the summary is illustrative only and is not intended to be in any way limiting. In addition to the illustrative aspects, embodiments, and features described hereinabove, further aspects, embodiments, and features will become apparent by reference to the drawings and the following detailed description.

BRIEF DESCRIPTION OF THE DRAWINGS

The invention will be more fully understood by reference to the detailed description in conjunction with the following figures, wherein:

FIG. 9 is a view in perspective of a base belonging to a fifth embodiment reconfigurable cat litter box, the base having an upright blocking panel integrally formed therewith;

FIG. 10 is a view in perspective of a cover belonging to the fifth embodiment reconfigurable cat litter box;

DETAILED DESCRIPTION

Figure 1:
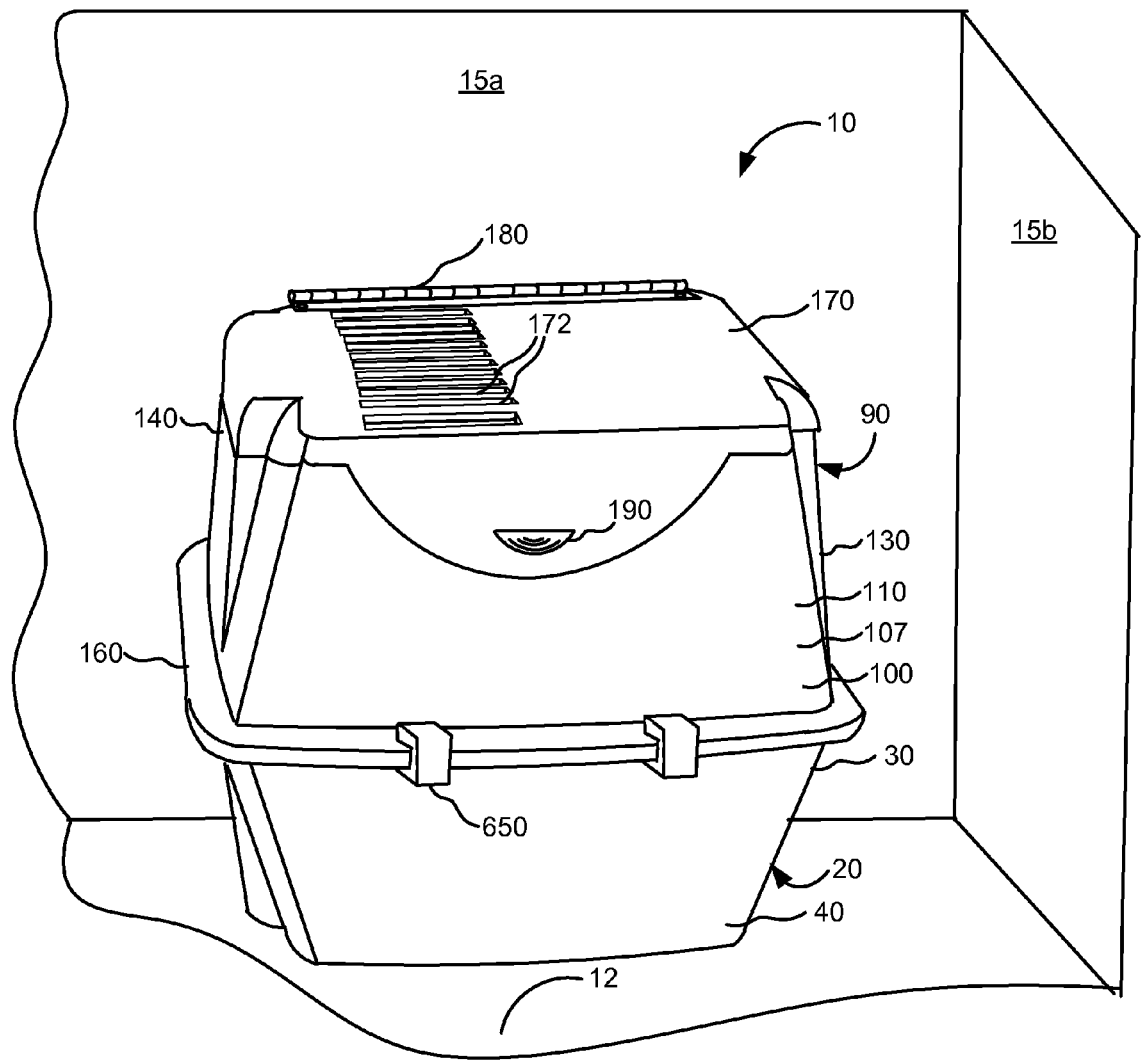
FIG. 1 is a view in perspective of a first embodiment reconfigurable cat litter box, the first embodiment reconfigurable cat litter box including a base and a cover mounted on the base and releasably secured thereto by means of at least one latch, the cover including a lid pivotably coupled to the cover by means of a hinge.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from either the spirit or scope of the invention.

In addition, the present patent specification uses formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

Figure 2:
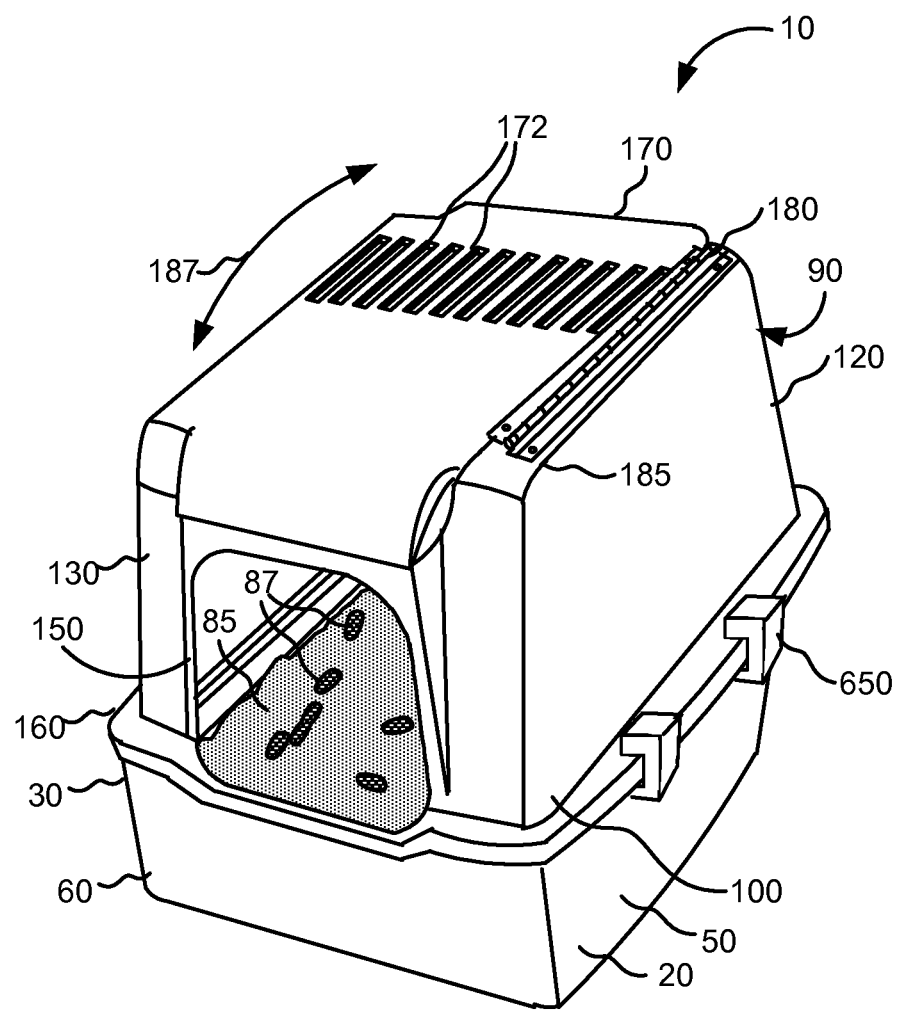
FIG. 2 is a view in perspective of the first embodiment reconfigurable cat litter box, this view showing the hinge pivotally coupling the lid to the cover, the hinge being set-back from an upper, outer edge of the cover.
Figure 2A:
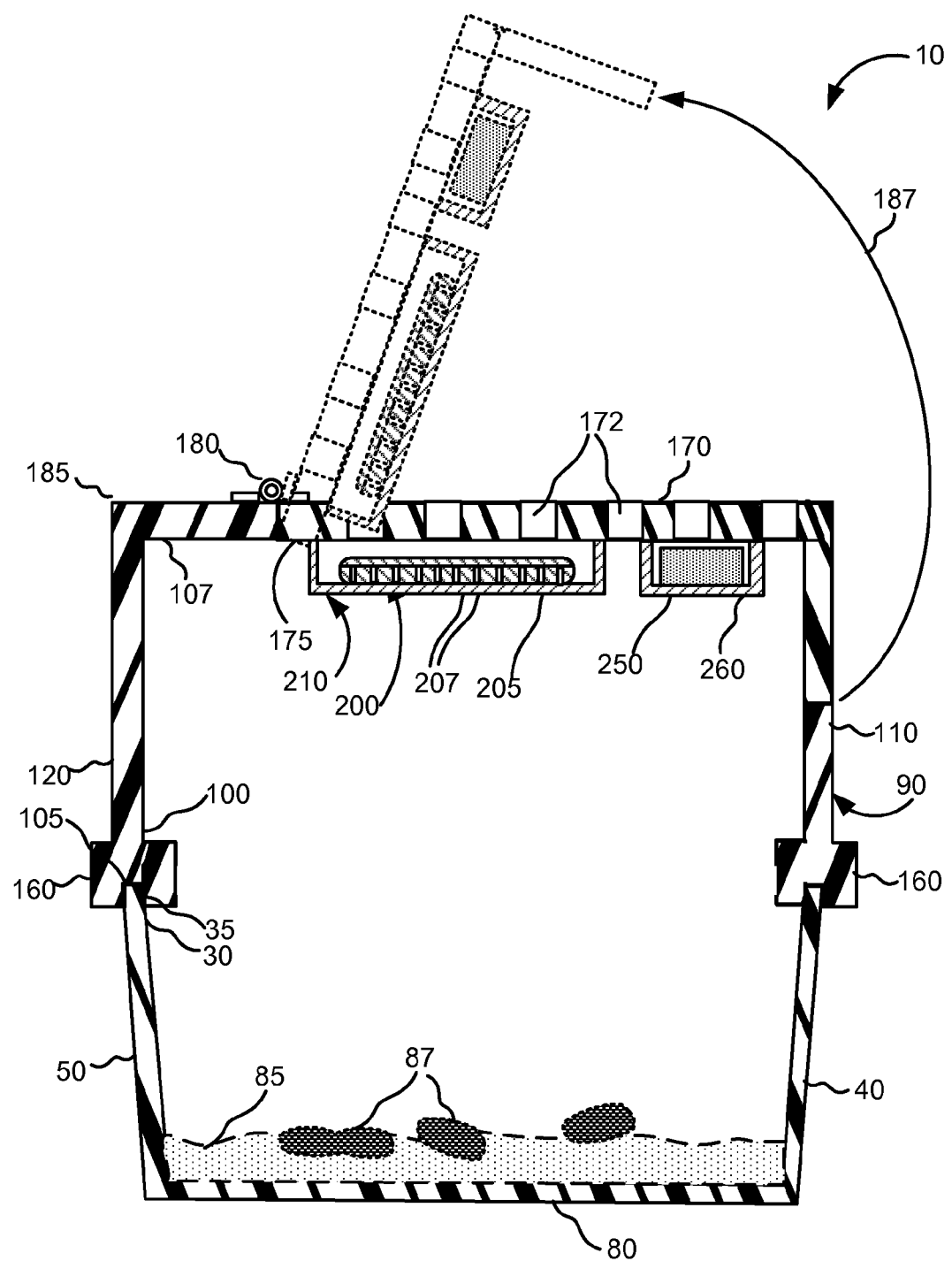
FIG. 2A is a view in vertical section of the first embodiment reconfigurable cat litter box, this view also showing the lid in a closed position and in an open position (shown in phantom)
Figure 2B:
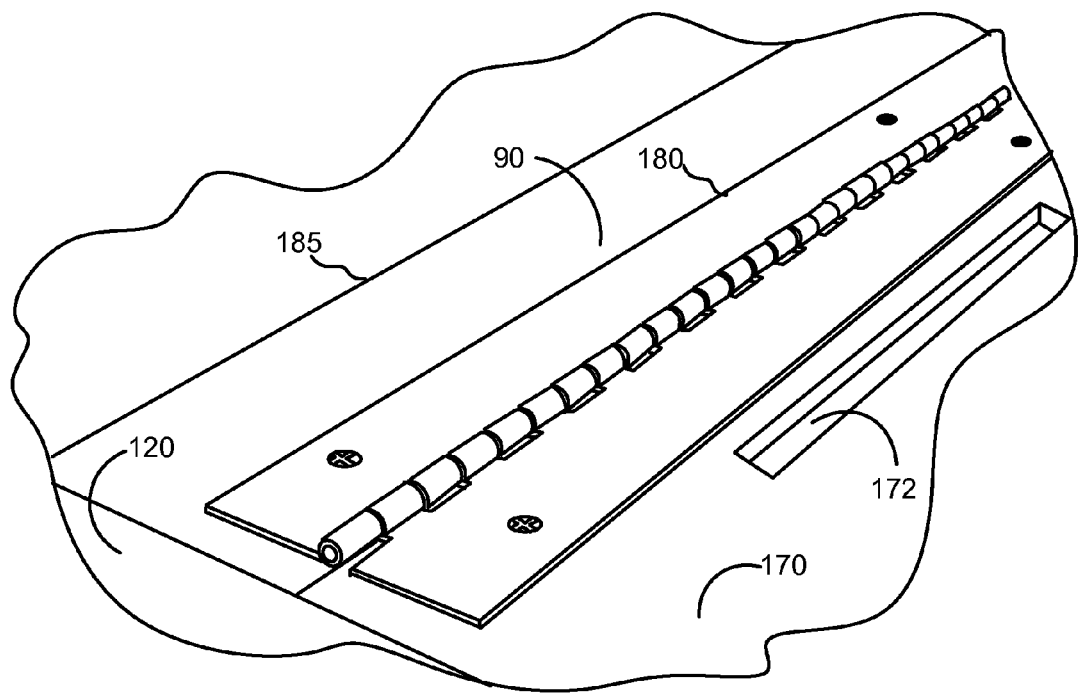
FIG. 2B is a fragmentary view in perspective of the hinge coupling the cover to the lid of the first embodiment reconfigurable cat litter box, this view also showing a vent defined by the lid venting volatile gases from the interior of the litter box.

Therefore, with reference to FIGS. 1, 2 and 2A, there is shown a first embodiment reconfigurable cat litter box, generally referred to as 10, disposed on a floor 12 adjacent a plurality of walls 15a and 15b. The first embodiment reconfigurable cat litter box 10 (hereinafter referred to as "litter box 10") includes a generally parallelpiped-shaped base 20 having an open top end 30 defining an upper perimeter 35 therearound. Base 20 has a first side wall 40 and an opposing second side wall 50. Base 20 also has a first end wall 60 and an opposing second end wall 70 (see FIG. 3).

As best seen in FIG. 2A, interconnecting first side wall 40, second side wall 50, first end wall 60, and second end wall 70 is a bottom panel 80. Thus, this configuration of base 20 is adapted to hold cat litter 85, which may be a commercially available "clumping" type of cat litter. In this regard, clumping type cat litter 85, which forms no part of the present invention, is typically a chemical composition comprising diatomaceous earth that is 80% to 90% silica ($SiO_2$) with the remaining constituents being alumina ($AlO_3$) and iron oxide ($Fe_2O_3$). Granular size of the cat litter is usually about 0.5 millimeters (0.0197 inch) to about 2 millimeters (0.0787 inch) and density is typically about 0.9 grams per cubic centimeter (56.19 pounds per cubic foot) to about 0.95 grams per cubic centimeter (59.31 pounds per cubic foot). This chemical composition and density of cat litter 85 allows cat litter 85 to be absorbent and facilitates formation of compact waste clumps 87 for easier collection and disposal.

Figure 13:
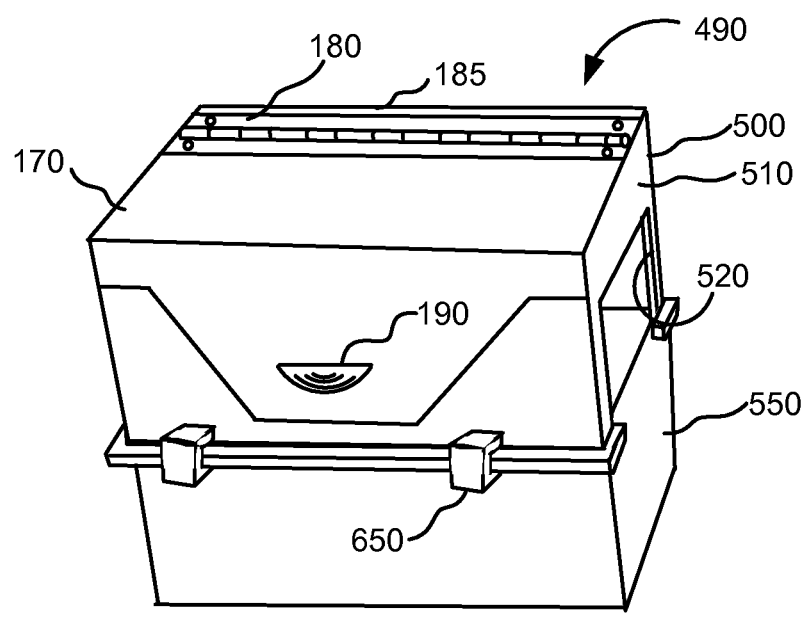
FIG. 13 is a view in perspective of the fifth embodiment reconfigurable cat litter box, this view showing a first access opening defined by a first end wall of the cover.
Figure 14:
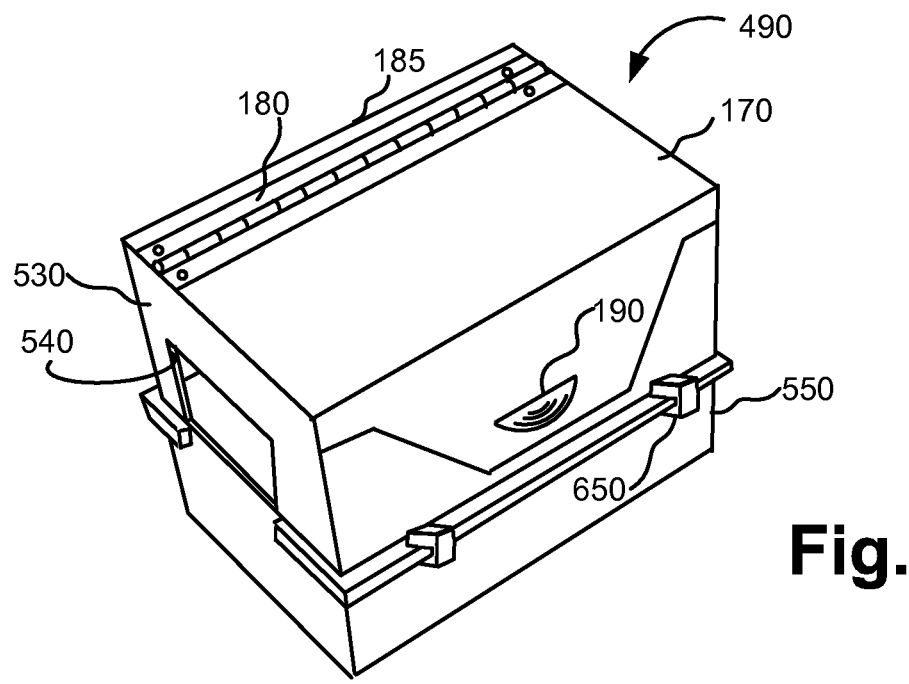
FIG. 14 is a view in perspective of the fifth embodiment reconfigurable cat litter box, this view showing a second access opening defined by a second end wall of the cover.
Figure 15:
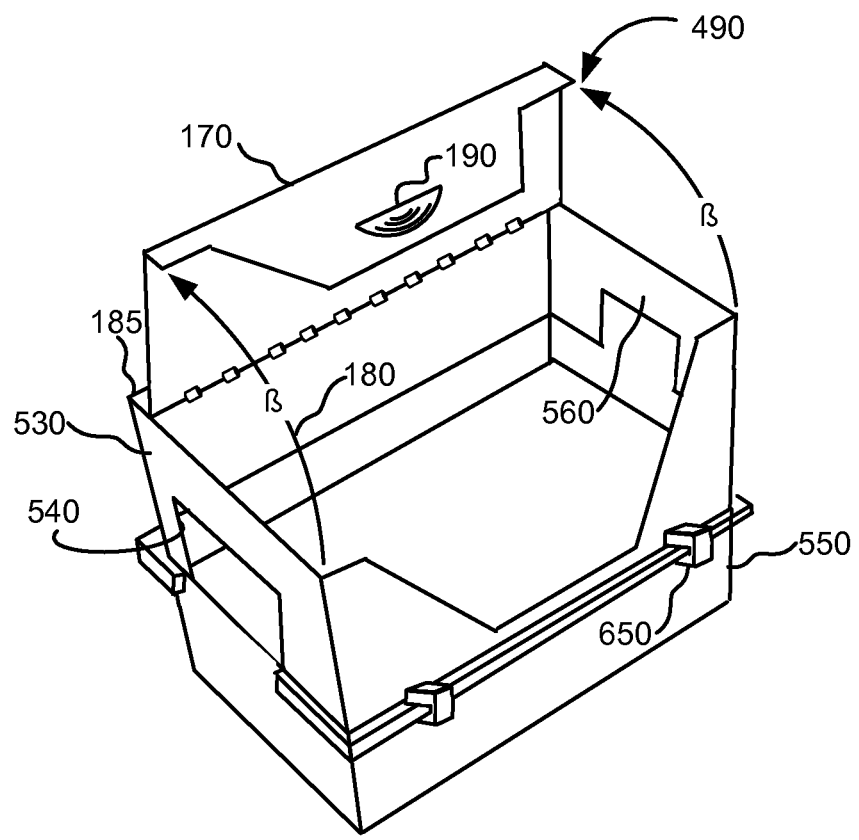
FIG. 15 is a view in perspective of the fifth embodiment reconfigurable cat litter box, this view showing the lid in an open position after being pivoted through an angle beta "β"

Referring again to FIGS. 1, 2 and 2A, litter box 10 also includes a cover, generally referred to as 90, that is mountable atop base 20. Cover 90 is generally parallelpiped-shaped and has an open bottom end 100 defining a lower perimeter 105 therearound. Cover also has an open top end 107 for reasons disclosed hereinbelow. In addition, cover 90 has a first side wall 110 and an opposing second side wall 120. Cover 90 also has a first end wall 130 and an opposing second end wall 140. First end wall 130 defines a cat access opening 150 for a cat 145, having paws 147 (see FIG. 7), to enter and leave litter box 10. Second end wall 140 may define another cat access opening 540 (see FIG. 13) for reasons provided hereinbelow. An outwardly projecting, back-chamfered flange 160 extends around lower perimeter 105 of cover 90 for seating cover 90 on upper perimeter 35 of base 20.

Referring to FIGS. 1, 2, 2A and 2B, cover 90 includes a generally planer lid 170 for opening and closing open top end 107 of cover 90, the lid 170 defining at least one vent 172 therethrough for reasons provided hereinbelow. The lid 170 also has an underside surface 175 to which is coupled litter box accessories, as described in detail hereinbelow. Lid 170 is pivotally coupled to cover 90 by means of an elongate hinge 180. The hinge 180 may be any suitable hinge, such as a hinge commonly referred to in the art as a "piano hinge" or "continuous hinge." Hinge 180 is desirably formed from a soft, non-metallic material, such as a relatively soft rubber or polymer, to reduce the risk that hinge 180 will mar walls 15a/15b should hinge 180 contact walls 15a/15b. In this regard, the non-metallic hinge 180 may have a Durometer Shore A hardness value of between about 80 and about 90. The likelihood hinge 180 will contact either of walls 15a/15b and mar walls 15a/15b is further reduced due to hinge 180 being set-back a predetermined distance (e.g., about three inches or 7.7 centimeters) from an outermost, upper edge 185 of cover 90, so that hinge 180 cannot contact any wall near which litter box 10 is placed. Lid 170 can be manually pivoted in the direction of directional arrow 187 for opening and closing lid 170 and includes a recess or an indentation 190 formed therein for that purpose. Thus, lid 170 provides the cat owner or care giver access to the interior of litter box 10 for removing soiled litter clumps 87 and for refilling cat litter box 10 with fresh litter 85. In addition, lid 170 provides the cat owner or care giver with an alternative means of accessing the interior of litter box 10, such that use of lid 170 avoids the need to lift and remove the entire cover 90 in order to access the interior of litter box 10. Alternatively, at least one latch 650 (see FIG. 18D) is provided for fastening cover 90 to base 20, as described in detail hereinbelow. Unfastening latch 650 and lifting cover 90 from base 20 allows access to the interior of base 20 for removing soiled litter soiled litter waste clumps 87 and for refilling the base with fresh litter. Thus, cover 90 can remain fastened to base 20 by means of latch 650 and access to the interior of base 20 is obtained by pivoting lid 170 to an open position. The cat litter box is reconfigurable in the sense that lid 170 can remain closed and latch 650 can be unfastened to allow cover 90 to be lifted from base 20 to obtain access to the interior of base 20 for removing soiled litter waste clumps 87 and for refilling base 20 with fresh litter.

Figure 3:
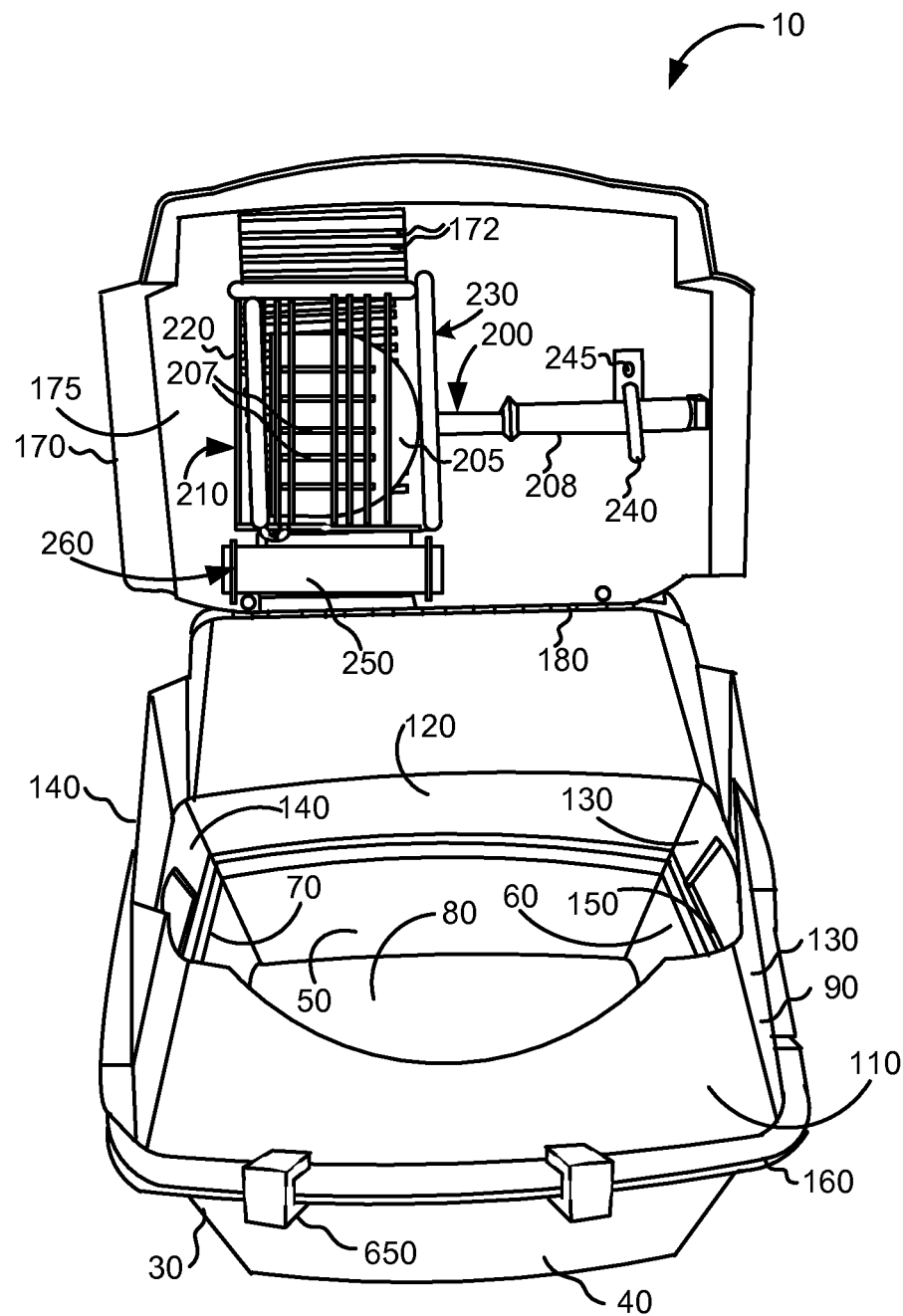
FIG. 3 is a view in perspective of the first embodiment reconfigurable cat litter box, this view showing a litter scoop received in a litter scoop holder and a deodorizer received in an optional deodorizer support, the litter scoop holder and the optional deodorizer support being coupled to an underside surface of the lid.
Figure 4:
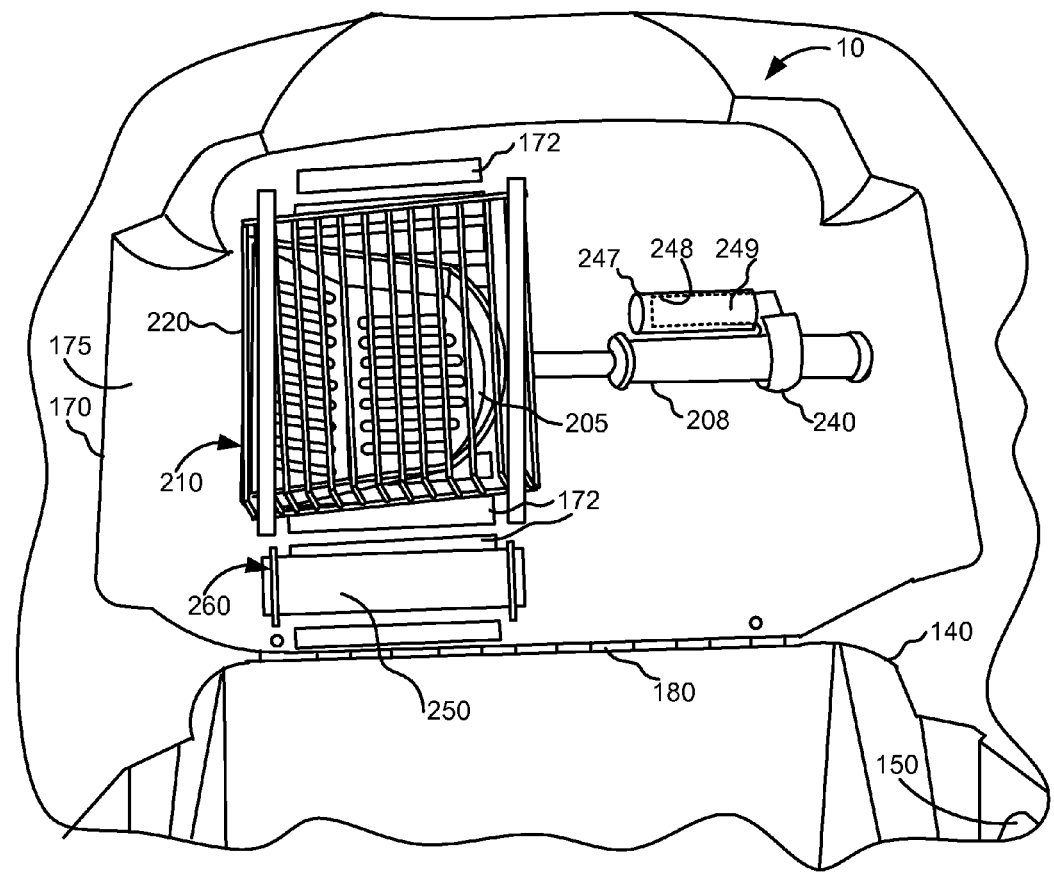
FIG. 4 is a fragmentary view in perspective of the first embodiment reconfigurable cat litter box, this view showing the litter scoop holder and the optional deodorizer support coupled to the underside surface of the lid.

As best seen in FIGS. 2A, 3 and 4, a litter scoop, generally referred to as 200, is used by the cat owner or care giver to rake, sift and scoop litter clumps 87 from litter box 10. Litter scoop 200, which forms no part of the present invention, may be a commercially available litter scoop that has a scoop portion 205 with perforate walls to allow unclumped cat litter to pass through a plurality of perforations 207 defined by litter scoop portion 205 while simultaneously retaining waste clumps 87 on litter scoop portion 205. Litter scoop 200 also has a litter scoop handle 208 attached to litter scoop portion 205 for manipulating litter scoop 200. However, as previously mentioned, litter scoop 200 will typically retain residual, contaminated cat litter micro-particles or debris (not shown) adhering to litter scoop 200, particularly in and around perforations 207, after litter scoop 200 is used. Merely placing litter scoop 200 on floor 12 next to cat litter box 10 after using litter scoop 200 increases the risk that the contaminated litter particles will be tracked into adjacent rooms (not shown) or deposited and scattered onto adjacent furniture surfaces (also not shown) due to human foot traffic and other human and cat activity. As stated hereinabove, the tracked and scattered litter particles can pose a health risk to humans. Avoiding the need to place litter scoop 200 on floor 12 reduces the risk that contaminated litter particles will be tracked into adjacent rooms or deposited onto adjacent furniture surfaces.

Therefore, referring again to FIGS. 2A, 3 and 4, a litter scoop holder, generally referred to as 210, is coupled to underside surface 175 of lid 170 for storing litter scoop 200 after use. In this manner, any residual, contaminated cat litter micro-particles or debris adhering to litter scoop 200 will fall and be returned to cat litter 85 when lid 170 is closed. To achieve this result, a configuration of litter scoop holder 210 includes a screen or wire mesh 220 removably secured to underside surface 175 of lid 170 by means of a bracket arrangement, generally referred to as 230, that is attached to underside surface 175 of lid 170. In other words, both wire mesh 220 and bracket arrangement 230 are present. In this configuration, bracket arrangement 230 is configured such that wire mesh 220 can be slidably inserted into and slidably removed from bracket arrangement 230 for reasons provided momentarily. Bracket arrangement 230 is attached to underside surface 175 of lid 170 by any suitable means, such as by a plurality of screws (not shown) or adhesive (also not shown). However, as an alternative configuration of litter scoop holder 210, bracket arrangement 230 need not be present, if desired. Rather, wire mesh 220 may be affixed to underside surface 175 of lid 170 by any convenient means, such as by a plurality of screws (not shown) or adhesive (also not shown). Elimination of bracket arrangement 230 can reduce labor and material costs during manufacture of the cat litter box. As another alternative configuration of litter scoop holder 210, wire mesh 220 need not be present. Rather, bracket arrangement 230 may be affixed to underside 175 of lid 170 by any convenient means, such as by a plurality of screws (not shown) or adhesive (also not shown). Elimination of wire mesh 220 can reduce labor and material costs during manufacture of the cat litter box. In other words, bracket arrangement 230 and wire mesh 220 may both be present; only bracket arrangement 230 may be present and not wire mesh 220; or only wire mesh 220 may be present and not bracket arrangement 230. It should be appreciated that in any of these configurations, wire mesh 220 and/or bracket arrangement 230 are sized so that the scoop portion of litter scoop 200 will snugly fit within wire mesh 220 or bracket arrangement 230, as the case may be. Appropriately sizing wire mesh 220 and/or bracket arrangement 230 prevents the scoop portion of litter scoop 200 from "rattling around" (i.e., excessively moving) within wire mesh 220 and/or bracket arrangement 230, as the case may be. Litter scoop holder 210 also includes a hook 240 is also attached to underside surface 175 of lid 170, such as by an adhesive (not shown) or a screw or bolt 245, for releasably retaining handle 208 of litter scoop 200 (see FIG. 3). Alternatively, according to another configuration of hook 240, a receptacle 247 (see FIG. 4) having a bore or slot 248 therein can be provided for removably receiving an arm portion 249 of hook 240. Receptacle 247 may be attached to underside surface 175 by any suitable attachment means, such as by an adhesive. Providing receptacle 247, rather than bolt or screw 245, to connect hook 240 to underside surface 175 can allow easier assembly of litter box 10 during manufacture of litter box 10. It should be appreciated that, in either of these configurations of hook 240, the hook 240 is sized so that handle 208 will snugly fit within hook 240. Appropriately sizing hook 240 prevents handle 208 from "rattling around" (i.e., excessively moving) within hook 240. In this manner, litter scoop holder 210 allows litter scoop 200 to be releasably secured to underside surface 175 of lid 170. When lid 170 is closed by the cat owner or care giver, any residual, contaminated cat litter micro-particles or debris adhering to litter scoop 200 will fall from litter scoop 200, through wire mesh 220 and/or bracket arrangement 230 and be returned to cat litter 85. Thus, litter scoop holder 210 avoids the need to place litter scoop 200 on floor 12 and, therefore, reduces the risk that contaminated litter particles will be tracked into adjacent rooms or deposited onto adjacent furniture surfaces. Periodically, according to one of the configurations previously mentioned, wire mesh 220 may be slidably removed from bracket arrangement 230 and shaken over litter 85 to dislodge litter particles adhering to wire mesh 220, so that such litter particles fall and are returned to litter 85. In this manner, wire mesh 220 can be cleaned of litter particles, if any. Alternatively, wire mesh 220 may be removed and placed in a disinfecting solution (not shown) for removing such litter particles and for sanitizing wire mesh 220. After removing and cleaning wire mesh 220, the wire mesh 220 is returned to bracket arrangement 230.

Referring to FIGS. 1, 2, 2A, 3 and 4, an offensive odor will emanate from waste matter present in cat litter 85 that is disposed in cat litter box 10 unless precautions are taken to substantially eliminate the odor. The odor, which is due to release of ammonia and hydrogen sulfide volatile gases, is substantially eliminated by presence of a deodorizer 250 removably secured to underside surface 175 of lid 170. Deodorizer 250, which forms no part of the present invention, may be any suitable, commercially available deodorizer, such as porous activated carbon (C) that will adsorb or absorb the gases. Deodorizer 250 is removably secured to underside surface 175 of lid 170 by means of another bracket arrangement, generally referred to as 260. Deodorizer 250 is removable in order to exchange deodorizer 250 with a fresh deodorizer, if required. Alternatively, rather than an activated carbon deodorizer, deodorizer 250 may comprise a solid perfumed composition, such as bees wax combined with jojoba oil or almond oil, to mask odors emanating from waste matter present in litter 85. Bracket arrangement 260 is attached to underside surface 175 of lid 170 by means of a plurality of fasteners (not shown) or adhesive (also not shown). Previously mentioned vents 172 and also access opening 150 will allow release of the gases from the interior of cat litter box 10, so that the gases do not build-up or accumulate in the interior of cat litter box 10. However, when activated carbon is used, a substantial amount of the gases should be nonetheless adsorbed or absorbed by deodorizer 250 before the gases are released through vent 172 and access opening 150.

Figure 5:
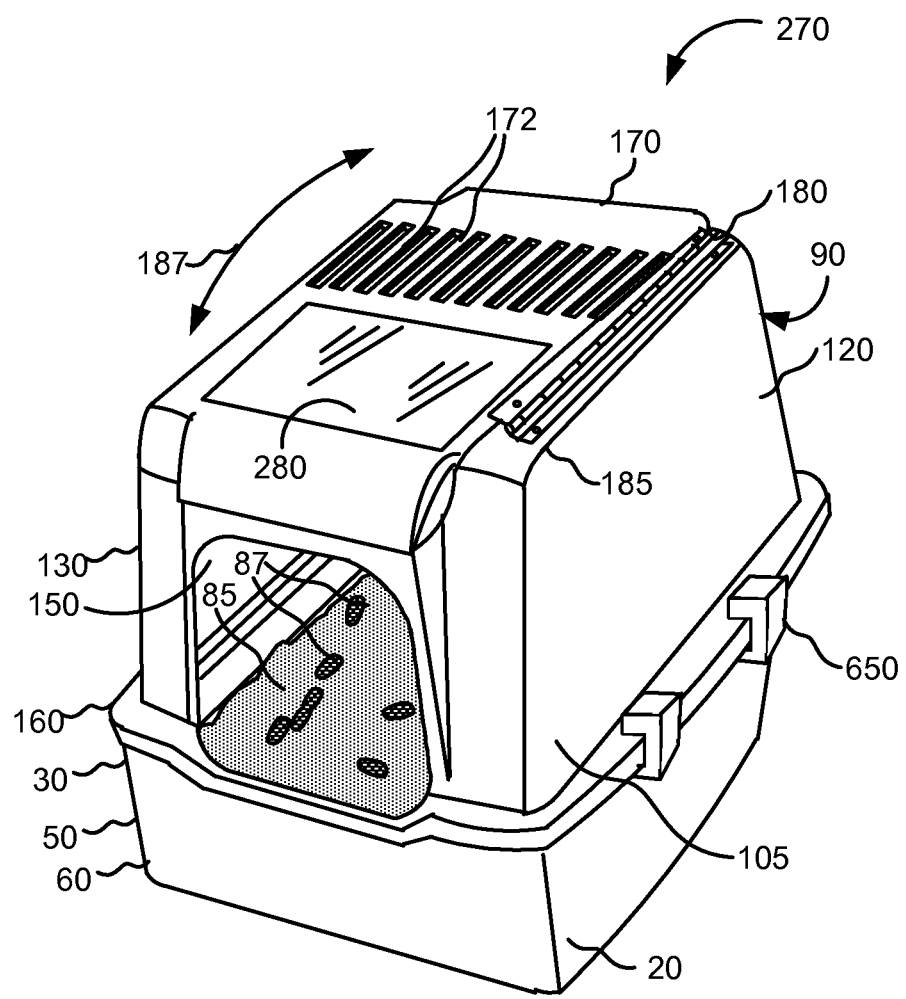
FIG. 5 is a view in perspective of a second embodiment reconfigurable cat litter box, this view showing the lid including a one-way transparent viewing window.

Referring to FIG. 5, there is shown a second embodiment reconfigurable cat litter box, generally referred to as 270, Second embodiment reconfigurable cat litter box 270 (hereinafter referred to as "litter box 270") is similar to litter box 10, except a one-way transparent viewing window 280 is disposed in lid 170 for viewing the interior of litter box 270 to ascertain if cat 145 is present in litter box 270. As previously mentioned, if cat 145 is startled or otherwise disturbed while cat 145 is defecating or urinating in the litter box, cat 145 may bolt from the litter box and track waste outside the litter box. In order to avoid this result, one-way transparent viewing window 280 allows the cat owner or care giver to ascertain when cat 145 is present in litter box 270, so that the cat owner or care giver will not attempt servicing litter box 270 while cat 145 is present in litter box 270. The one-way transparent viewing window 280 is opaque when viewed from inside litter box 270 and clear when viewed from outside litter box 270. In this regard, an inside surface of the one-way transparent viewing window 280 is coated with a composition, such as a thin reflective layer of aluminum, silver or other metal or metal alloy. Alternatively, the inside surface of the one-way transparent viewing window 280 can be coated with a thin nonreflective layer, such as a composition containing a dye and titanium. The one-way transparent viewing window 280 allows the cat owner or care giver to view the interior of litter box 270 without cat 145 seeing the cat owner or care giver, thereby decreasing the risk that cat 145 will be startled by the nearby presence of the cat owner or care giver. Therefore, this embodiment of the invention allows the cat owner or care giver to view the interior of litter box 270 before the cat owner or care giver services litter box 270.

As previously mentioned, it has been observed that, after cat 145 uses cat litter 85, particles of granulated or pelletized litter from cat litter 85 may, at least temporarily, adhere to the cat's paws 147. When this occurs, cat 145 will then track the litter onto nearby surfaces after cat 145 exits the cat litter box. It is desirable to prevent cat 145 from tracking the litter onto nearby surfaces in order to avoid time consuming cleanup and to reduce risk of contaminating the nearby surfaces with disease causing bacteria and protozoa.

Figure 6:
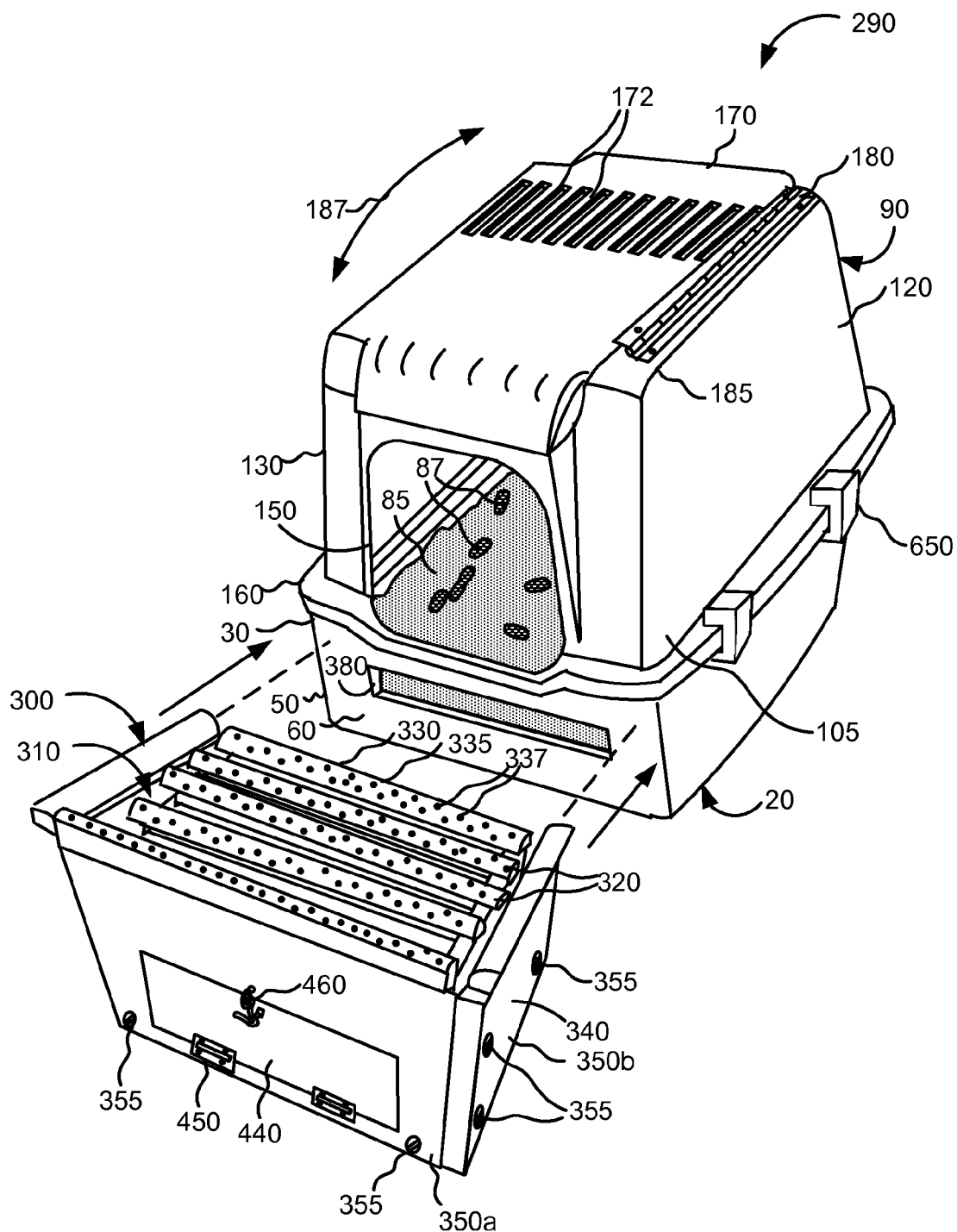
FIG. 6 is a view in perspective of a third embodiment reconfigurable cat litter box, this view showing a first configuration access ramp assembly adapted to remove litter particles from the paws of a cat exiting an interior of the litter box.
Figure 7:
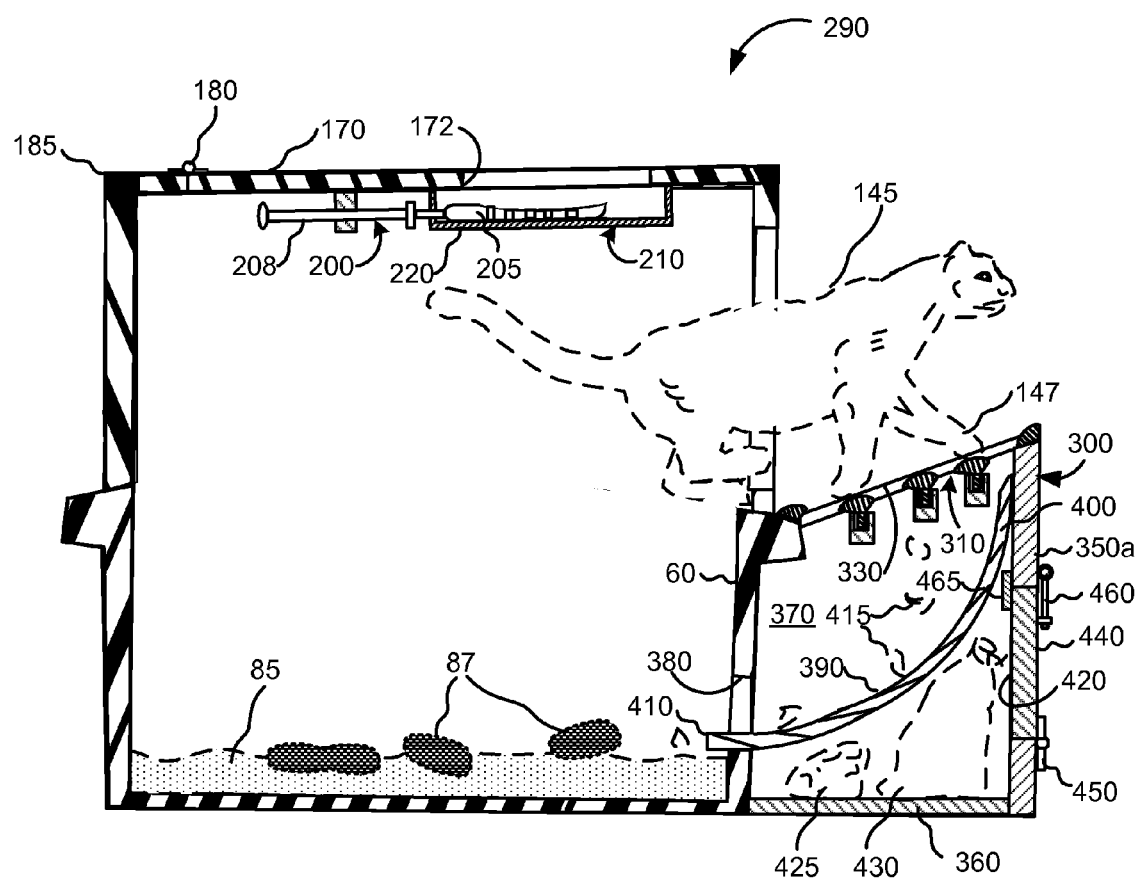
FIG. 7 is a view in vertical section of the third embodiment reconfigurable cat litter box.

Therefore, in FIGS. 6 and 7, a third embodiment reconfigurable cat litter box, generally referred to as 290, is there shown. Third embodiment reconfigurable cat litter box 290 (hereinafter referred to as "litter box 290"), is similar to litter box 10, except litter box 290 includes a first configuration access ramp assembly, generally referred to as 300. Ramp assembly 300 includes an inclined walkway or pathway, generally referred to as 310, that removes or dislodges tracked litter from paws 147 of cat 145. Pathway 310 upwardly, outwardly extends from near access opening 150 and includes a plurality of ascending stair steps 320 arranged parallel one to another. At least some of stair steps 320 may be relatively soft rubber or similar soft material for allowing cat 145 to comfortably travel or traverse along pathway 310. By way of example only, and not by way of limitation, there may be five stair steps 320. Alternatively, there may be more or fewer than five stair steps 320, if desired. However, it should be appreciated that the greater the number of stair steps 320, the greater the likelihood that all tracked litter will be removed from paws 147 of cat 145. In addition, although pathway 310 is described herein as being upwardly inclined or ascending, it should be understood, based on applicant's teachings herein, that pathway 310 may be level, or downwardly sloping or descending, if desired. Stair steps 320 are spaced-apart, so that adjacent stair steps 310 define a gap 330 therebetween. Stair steps 320 are removable for cleaning stair steps 320, when necessary. As disclosed hereinbelow, the litter box may have a plurality of cat access openings, such as two cat access openings. In this case, ramp assembly 300 can be disposed adjacent either access opening.

Referring again to FIGS. 6 and 7, a surface 335 of each stair step 320 may be textured for facilitating removal of tracked litter from paws 147 of cat 145. Surface 335 may be textured by means of a multiplicity of raised bumps or nodules 337, or other suitable texturing. Moreover, surface 335 of each stair-step 320 may be curved or convex, as shown, so that tracked litter more easily falls away from stair step 320 and does not remain on stair step 320, so that the tracked litter is not redeposited onto paws 147 of cat 145 as cat 145 travels pathway 310. In this manner, likelihood of tracked litter adhering to paws 147 and stair steps 320 as cat 145 travels pathway 310 is reduced.

Referring yet again to FIGS. 6 and 7, litter box 290 further includes a support structure, generally referred to as 340, coupled to pathway 310 for supporting pathway 310. Material comprising support structure 340 may be thin gauge, light-weight aluminum, or a suitable durable plastic material, such as acrylonitrile-butadiene styrene for reducing weight of support structure 340. Support structure 340 includes three upright side walls, such as a left sidewall (not shown), a front or center sidewall 350a and a right sidewall 350b. The left side wall and right side wall 350b are connected to center side wall 350a, such as by means of a suitable epoxy adhesive (not shown) or a plurality of screw fasteners 355. In this manner, the left side wall and side walls 350a/350b are perpendicularly disposed and connected to each other. The left side wall and side walls 350a/350b are also connected to a floor 360, such as by means of a suitable epoxy adhesive or screw fasteners 355. Hence, one side of support structure 340 is not bounded by a side wall, there being only three side walls present. In this manner, the left side wall, side walls 350a/b and floor 360 define an open volume 370 in support structure 340.

Still referring to FIGS. 6 and 7, support structure 340 is coupled to first end wall 60 of base 20, such as being positioned so as to contact first end wall 60, and so that open volume 370 is in communication with a litter return opening 380 that is defined by first end wall 60 of base 20, as shown. Disposed in open volume 370 is a concave, arcuate shaped low-friction litter return guide, chute or slide 390 having a first end portion 400 thereof connected to an inside surface of front side wall 350a. Alternatively, return slide 390 may have a convex, arcuate shape, if desired. However, litter return slide 390 need not have a concave or convex arcuate shape. Rather, litter return slide 390 may be flat and downwardly sloping, if desired. First end portion 300 of litter return slide 390 is connected to the inside surface of center side wall 350a by any convenient means, such as by at least one screw fastener (not shown) or by a suitable epoxy adhesive. A second end portion 410 of litter return slide 390 extends through litter return opening 380 that is defined by previously mentioned first end wall 60 of base 20. Litter return slide 390 may be thin gauge, light-weight, corrosion-resistant metal, such as aluminum, or a suitable durable plastic material, such as acrylonitrile-butadiene styrene for weight reduction and for resisting corrosion caused by urine-containing litter particles. Also, litter return slide 390 can be easily cleaned and disinfected by the cat owner or care giver, when required. More specifically, the cat owner or care giver can move support structure 340 away from litter return opening 380 to expose litter return slide 390. Moving support structure 340 away from litter return opening 380 provides immediate access to litter return slide 390 because support structure 340 does not have a left side wall. Absence of the left side wall allows the cat owner or care giver to access litter return slide 390 by reaching into volume 370 in order to remove any litter particles adhering to litter return slide 390. Absence of the left side wall also allows the cat owner or care giver access to litter return slide 390 for disinfecting litter return slide 390.

Referring yet again to FIGS. 6 and 7, as cat 145 traverses stair steps 320 belonging to pathway 310, tracked litter particles 415 clinging to paws 147 will be dislodged from paws 147 due to textured surface 335 of stair steps 320 and due to the mechanical friction occurring between paws 147 and stair steps 320. As the tracked litter particles 415 are dislodged from paws 147, the tracked litter particles 415 will fall from the curved or convex surface 335 of stair steps 320 and pass through gaps 330. As the tracked litter particles 415 pass through gaps 330, the tracked litter particles 415 will be received onto low-friction litter return slide 390 and slide downwardly therealong. As the tracked litter particles 415 slide downwardly along litter return slide 390, the tracked litter particles 415 will pass through litter return opening 380 to be returned to litter 85 contained in base 20. In this manner, ramp assembly 400 catches litter particles 415 tracked from base 20 by cat 145 and automatically returns tracked litter particles 415 to litter 85 contained in base 20.

As best seen in FIG. 7, litter return slide 390 divides open volume 370, so as to define a compartment 420 between litter return slide 390 and front or center side wall 350a. Compartment 420 may be used to store litter box accessories, such as cleaning materials 425 for cleaning litter return slide 390 and other portions of litter box 290 and/or for storing a plurality of litter bags 430, if desired, into which soiled litter is placed. The volume of compartment 420 can be increased, if desired, by configuring return slide 390 such that return slide 390 has the previously mentioned convex, arcuate shape. The cleaning materials 425 and litter bags 430 are commercially available and form no part of the present invention. A hinged door 440 is formed in front or center side wall 350a for allowing access to compartment 420. Door 440 is connected to front or center side wall 350a by means of at least one hinge 450 and can be locked in a closed position, such as by a hook fastener 460 coupled to front or center side wall 350a. Alternatively, rather than hook fastener 460, a first magnet (not shown) may be coupled to an exterior of center side wall 350a and a second magnet (also not shown), which has an opposite polarity end portion facing the first magnet, may be coupled to an exterior of door 440. In this case, the second magnet is vertically disposed adjacent to the first magnet for locking door 440 in the closed position by magnetic force. A stop 465 is affixed to the inside surface of front or center side wall 350a for preventing door 440 from pivoting inwardly into compartment 420. In this manner, door 440 opens only outwardly for providing convenient access to compartment 420.

With particular reference to FIG. 7, litter box 290 is illustrated as including three separate components. In other words, litter box 290 is illustrated as including previously mentioned base 20, cover 90 and ramp assembly 300 as separate components that can be arranged (i.e., configured) into a single assembly. However, as described in more detail hereinbelow, it will be appreciated, based on applicant's teachings herein, that base 20 and ramp assembly 300 should be manufactured as a unitary, single-piece component rather than as three separate components that are subsequently assembled together. That is, base 20 and ramp assembly 300 may be manufactured as a single unit, so as to prevent inadvertent formation of open seams or gaps in litter box 290. Although unlikely, inadvertent formation of open seams or gaps might occur during assembly of the three-piece litter box 290, if litter box 290 is assembled improperly. For example, this might occur if support structure 340 is not brought into intimate contact with first end wall 60 of base 20. A single-piece configuration that has ramp assembly 300 and base 20 formed as a single unit, rather than a three-piece configuration, provides added assurance that inadvertent open seams or gaps between ramp assembly 300 and base 20 are prevented. Such a construction prevents litter that may fall from cat 145 otherwise passing through such inadvertent open seams or gaps to land outside litter box 290.

Figure 8:
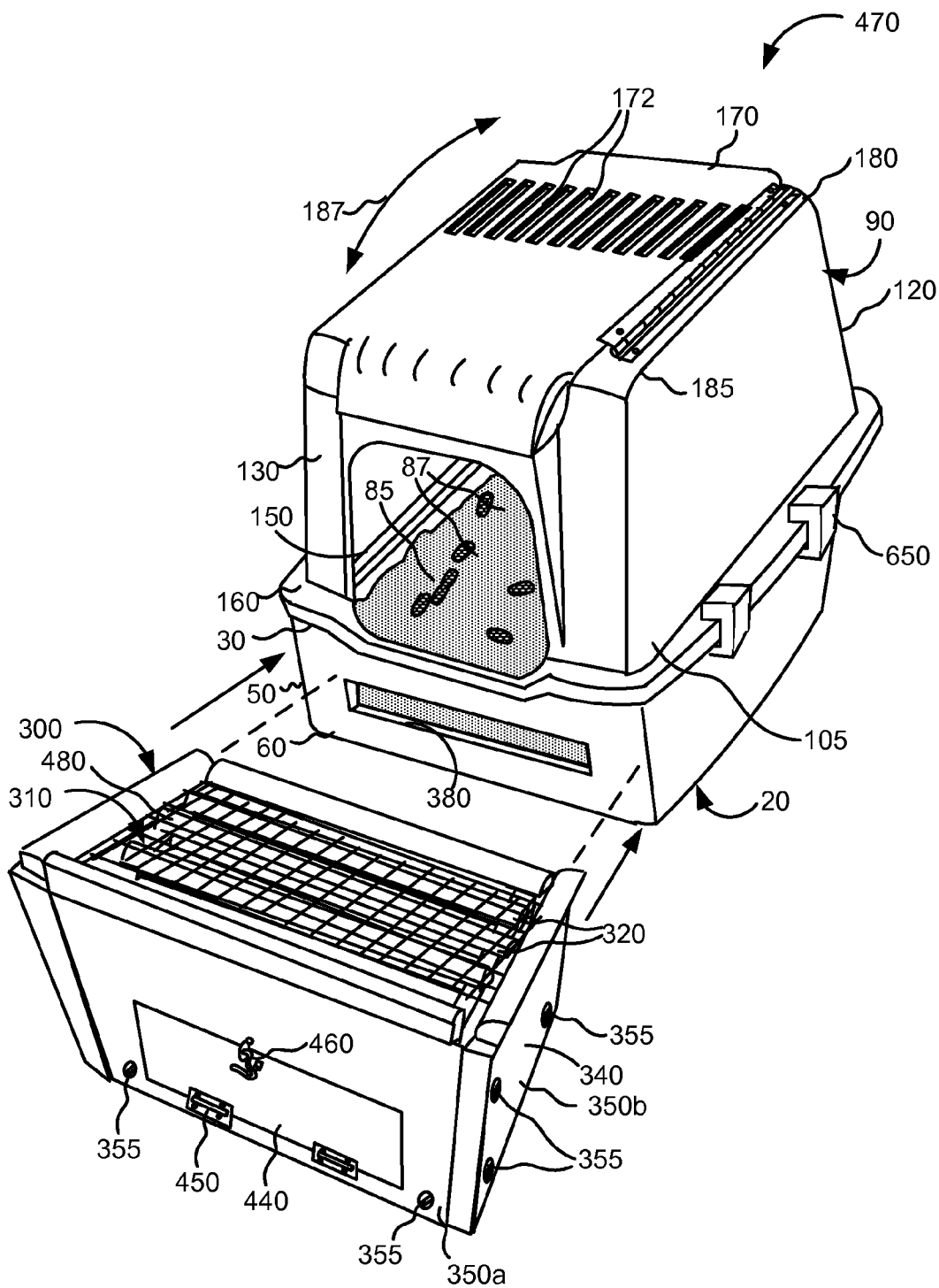
FIG. 8 is a view in perspective of a fourth embodiment reconfigurable cat litter box, this view showing a second configuration access ramp assembly adapted to remove litter particles from the paws of a cat exiting the interior of the litter box.
Figure 11:
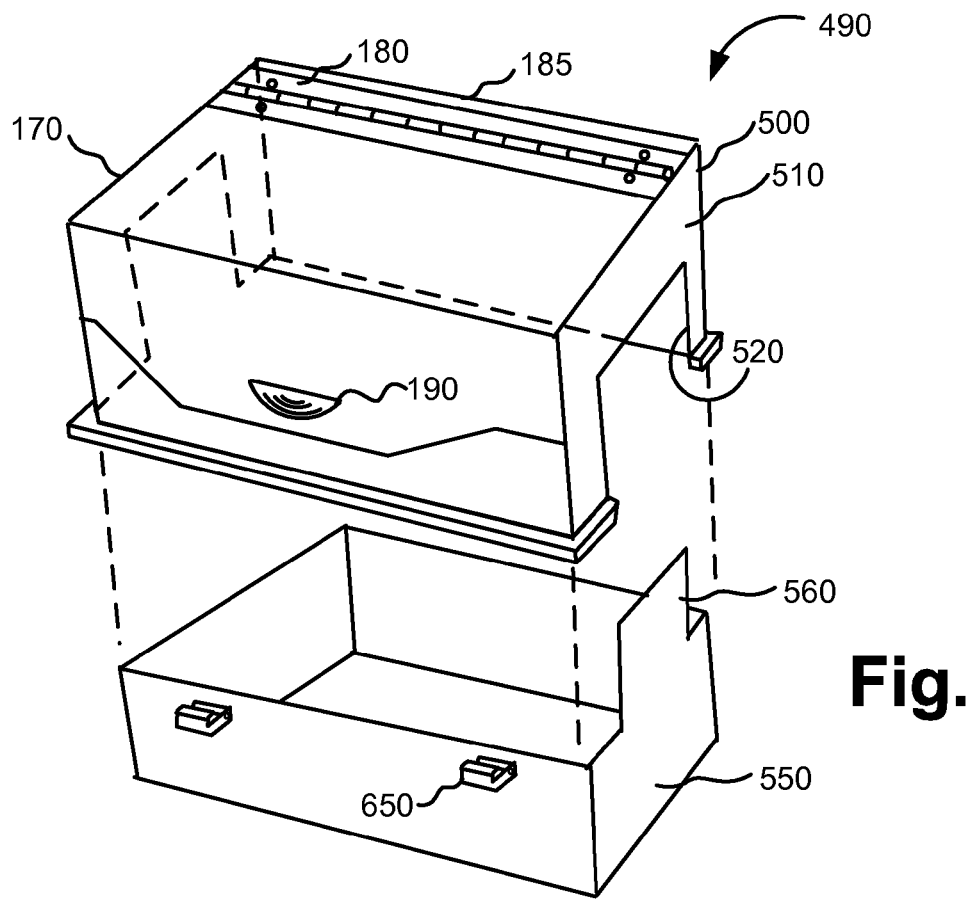
FIG. 11 is a view in perspective of the fifth embodiment reconfigurable cat litter box, this view showing the cover in alignment with the base prior to mounting the cover on the base.
Figure 12:
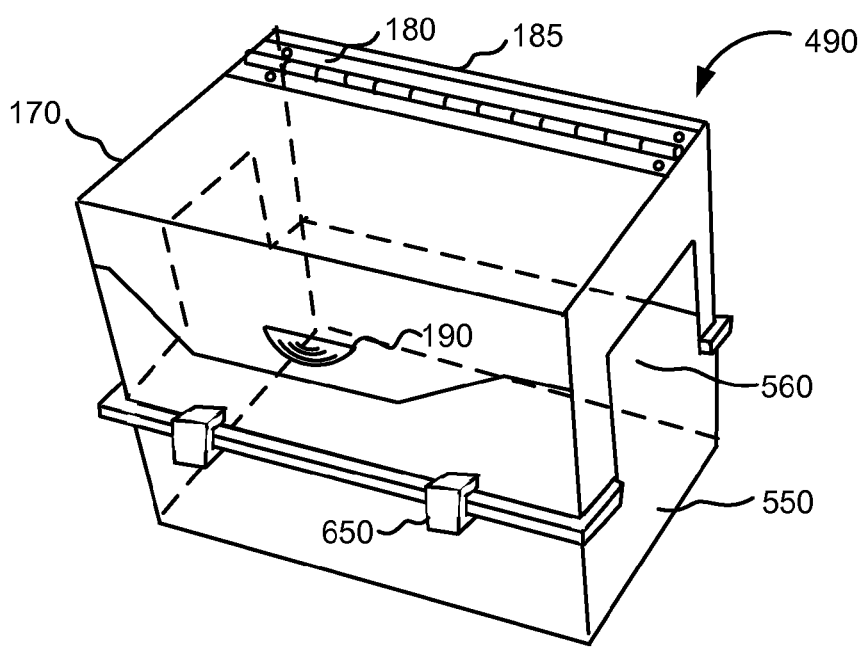
FIG. 12 is a view in perspective of the fifth embodiment reconfigurable cat litter box, this view showing the cover mounted on the base.

Referring to FIG. 8, there is shown a fourth embodiment reconfigurable cat litter box, generally referred to as 470, for catching and returning litter being tracked therefrom by cat 145. Fourth embodiment reconfigurable litter box 470 (hereinafter referred to as "litter box 470") is similar to litter box 290, except a second configuration access ramp assembly includes a removable, rubberized screen, mesh or grate 480 that is mounted on top of and spans stair steps 320. Grate 480 is removable for cleaning grate 480, when necessary. It has been observed that cat 145 may prefer traversing pathway 310 when pathway 310 has grate 480 thereon. This aspect of cat behavior can be advantageously used to encourage cat 145 to traverse pathway 310, so that tracked litter is removed from paws 147 of cat 145. In addition, it should be appreciated that, when grate 480 is present, some of stair steps 320 may be removed, if desired, in order to reduce material costs during manufacture of litter box 470. However, in this case, it is desirable that one or more middle-most stair steps 320 remain to support the weight of cat 145 as cat 145 walks across grate 480.

With reference to FIGS. 9, 10, 11, 12, 13, 14 and 15, a fifth embodiment reconfigurable cat litter box, generally referred to as 490, is there shown. Fifth embodiment reconfigurable cat litter box 490 (hereinafter referred to as "litter box 490") includes a dual-access cover 500 that has a first end wall 510 defining a first access opening 520 and a second end wall 530 defining a second access opening 540. First access opening 520 and second access opening 540 allow cat 145 ingress into and egress from cat litter box 490 in a manner described momentarily. In this regard, a base 550 includes an upright blocking panel 560 integrally formed therewith at an end of base 550. Blocking panel 560 is adapted (i.e., sized and shaped) to cover first access opening 520 or optionally to cover second access opening 540 for reasons described presently. More specifically, if home or apartment wall 15a/15b (see FIG. 1) or if furniture (not shown) interferes with the cat's access to first access opening 520, base 550 is manually rotated through an angle phi "φ" of 180° such that first access opening 520 is blocked by blocking panel 560. Blocking first access opening 520 in this manner discourages cat 145 from attempting to enter and exit cat litter box 490 through first access opening 520. Therefore, cat 145 will enter and exit cat litter box 490 through second access opening 540. Alternatively, if home or apartment wall 15a/15b or if furniture interferes with the cat's access to second access opening 540, base 550 is manually rotated through the angle phi "φ" of 180° such that second access opening 540 is blocked by blocking panel 560. Blocking second access opening 540 in this manner discourages cat 145 from attempting to enter and exit cat litter box 490 through second access opening 540. Therefore, cat 145 will enter and exit litter box 490 through first access opening 520. In either case, cover 500 is desirably kept stationary while base 550 is rotated. Reconfiguring the cat litter box by rotating base 550 allows litter box 490 to be disposed near virtually any wall 15a/15b, either perpendicularly, parallel, or at an angle with respect to either of walls 15a/15b, and without a need to rearrange furniture or other items to accommodate presence of litter box 490. Also, it should be understood that, based on the teachings immediately hereinabove, any of the other embodiments disclosed herein can include a blocking panel in combination with a first access opening and a second access opening for blocking the first access opening and the second access opening, if desired.

Figure 16:
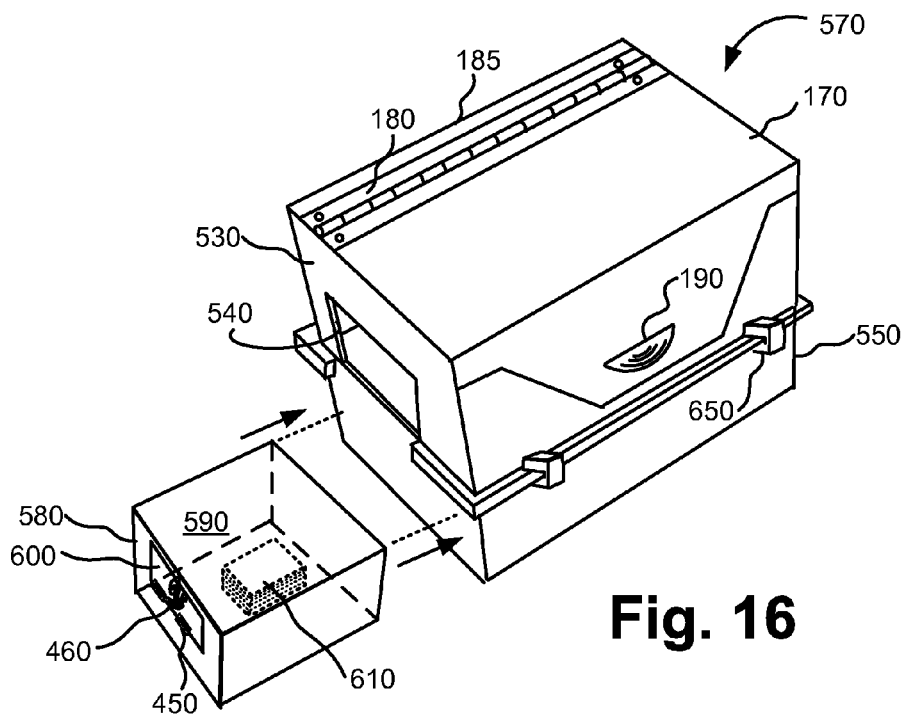
FIG. 16 is a view in perspective of a sixth embodiment reconfigurable cat litter box, this view showing an access platform in position to be disposed adjacent the second access opening defined by the cover, the access platform having an optional hollow interior for storage of litter box accessories, such as a stack of litter waste disposal bags.
Figure 17:
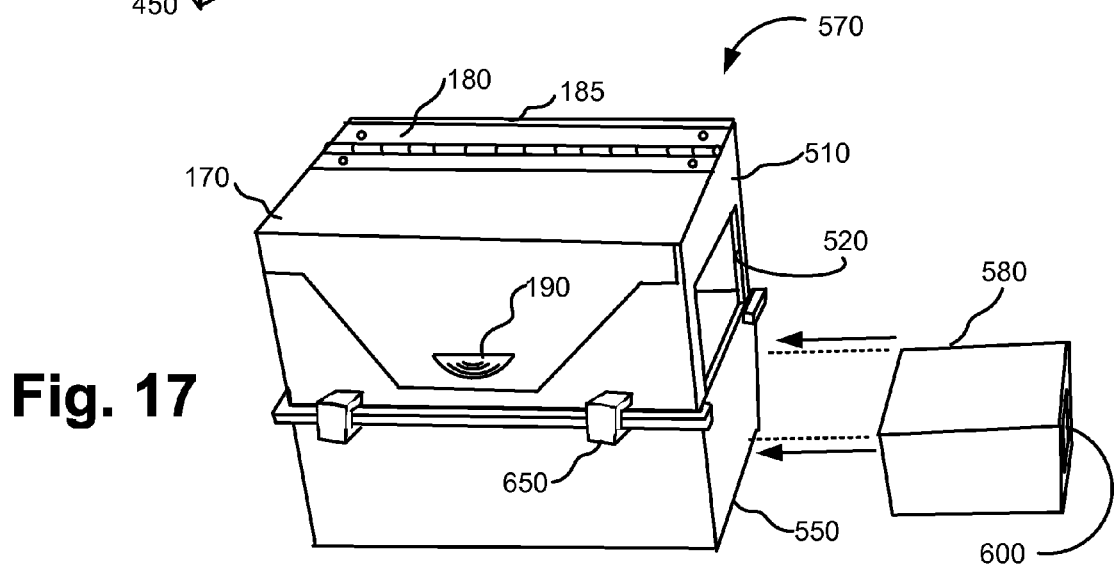
FIG. 17 is a view in perspective of the sixth embodiment reconfigurable cat litter box, this view showing the access platform in position to be disposed adjacent the first access opening defined by the cover.
Figure 18:
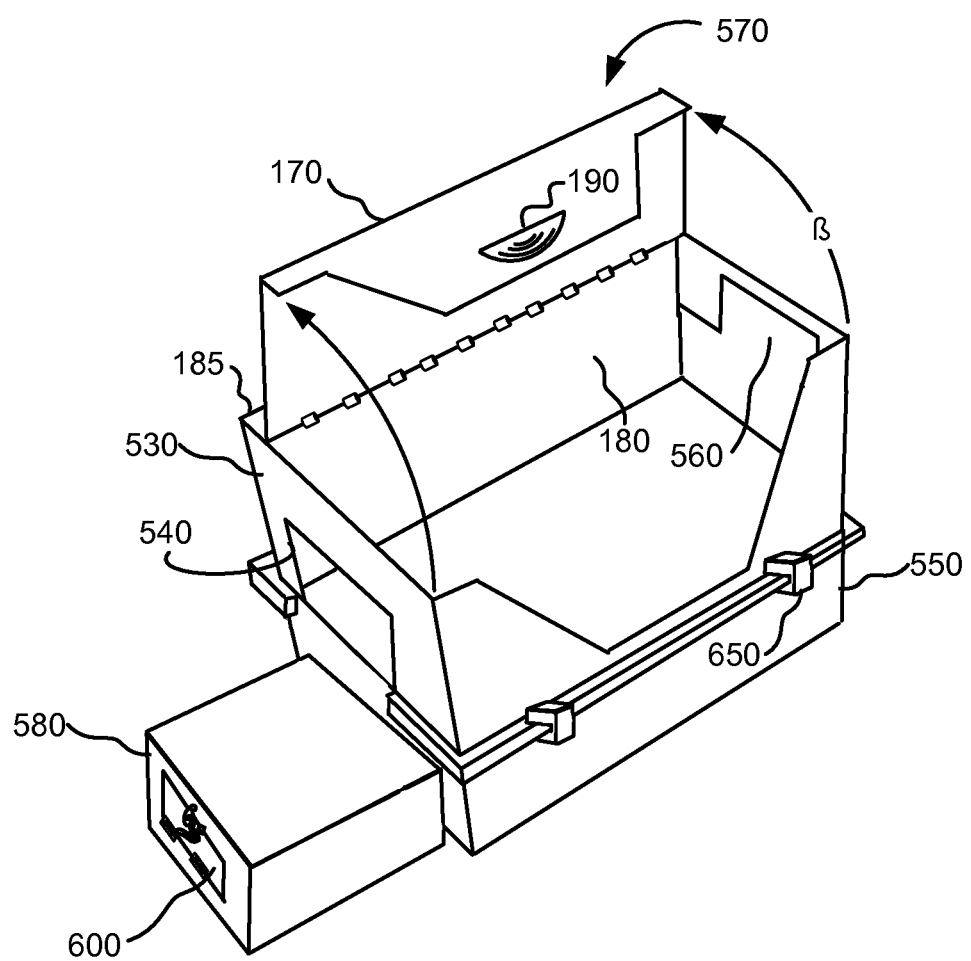
FIG. 18 is a view in perspective of the sixth embodiment reconfigurable cat litter box, this view showing the access platform disposed adjacent the second access opening and also showing the lid in an open position after being pivoted through the angle beta "β"

As shown in FIGS. 16, 17 and 18, a sixth embodiment reconfigurable cat litter box, generally referred to as 570, is there shown. Sixth embodiment reconfigurable cat litter box 570 (hereinafter referred to as "litter box 570") is similar to the fifth embodiment, except an access platform 580 is disposed adjacent first access opening 520 for facilitating passage of cat 145 through first access opening 520 or optionally adjacent second access opening 540 for facilitating passage of cat 145 through second access opening 540. If desired, access platform 580 may define a hollow interior 590 therein accessible by means of an access door 600 hingedly coupled to access platform 580 by means of previously mentioned hinges 450. Door 600 can be locked in a closed position, such as by previously mentioned hook fastener 460. Alternatively, rather than hook fastener 460, magnets (not shown) can be used in the manner disclosed hereinabove for locking door 600 in the closed position by magnetic force. In this case, hollow interior 590 is used for storage of accessory items, such as a stack of litter disposal bags 610 that are used for placement of soiled litter therein.

Figure 18A:
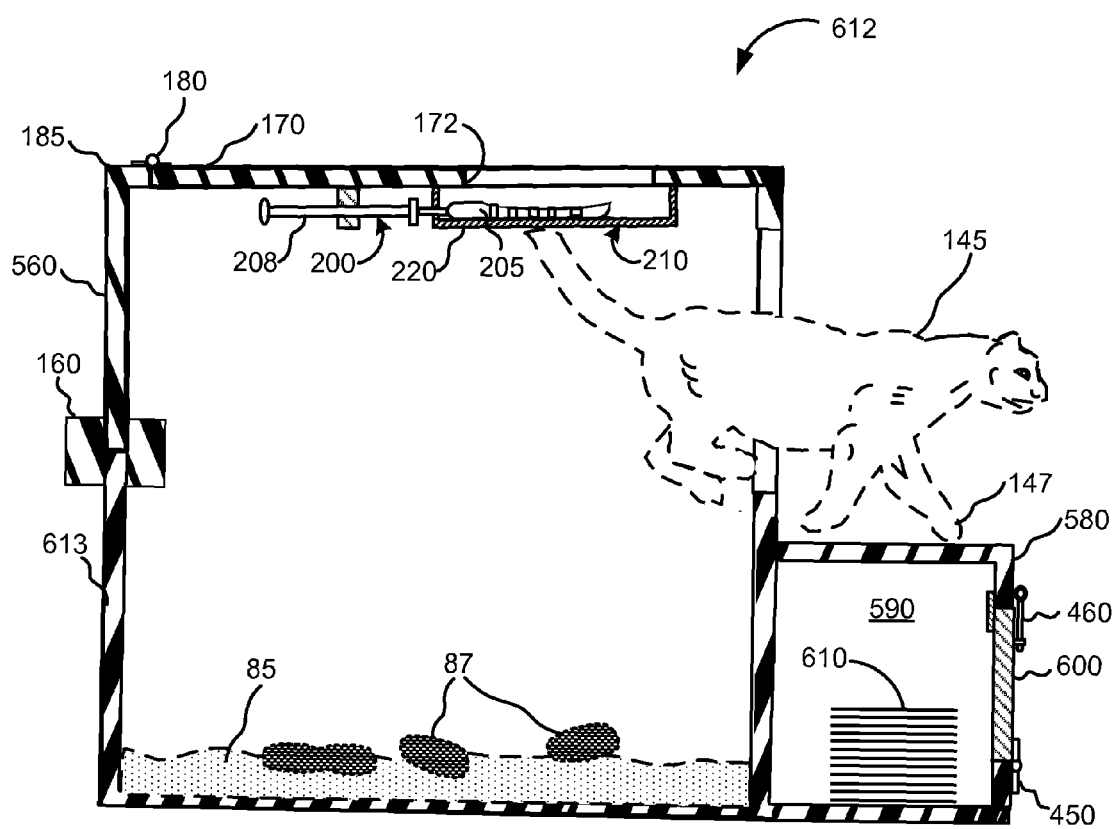
FIG. 18A is a view in vertical section of a seventh embodiment reconfigurable cat litter box, this view showing the access platform integrally formed with a base portion belonging to the reconfigurable cat litter box.

In FIG. 18A, a seventh embodiment reconfigurable cat litter box, generally referred to as 612, is there shown. Seventh embodiment reconfigurable cat litter box 612 (hereinafter referred to as "litter box 612") is similar to the sixth embodiment 570, except access platform 580 is integrally formed with base 550, so as to define an enclosure 613. In this regard, if litter box 612 is manufactured from a polymer, then litter box 612 may be manufactured as a unitary, single-piece component, as previously mentioned. In this case litter box 612 may be manufactured using a suitable injection mold process. Alternatively, if litter box 612 is manufactured from metal, then litter box 612 may be manufactured as a unitary, single-piece component using a suitable metal working process.

Figure 18B:
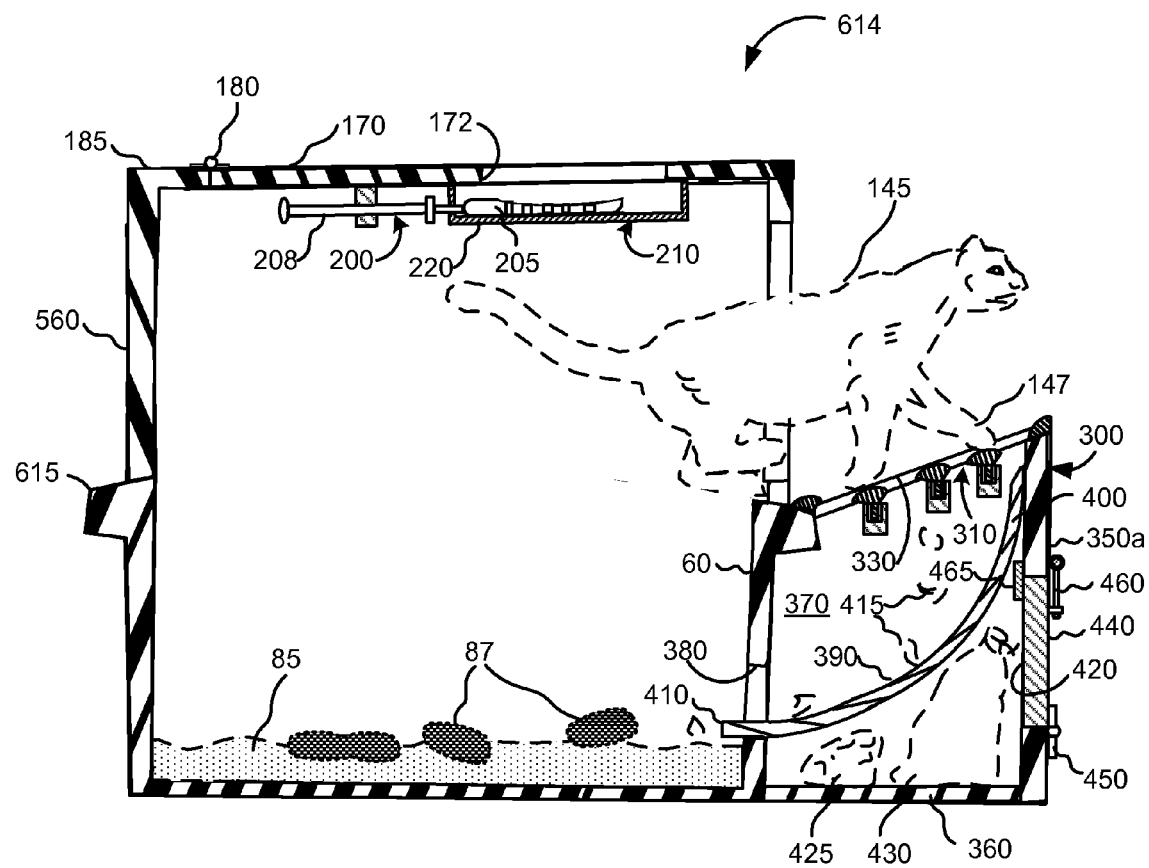
FIG. 18B is a view in vertical section of an eighth embodiment reconfigurable cat litter box, this view showing the access ramp assembly integrally formed with a base portion belonging to the reconfigurable cat litter box.

In FIG. 18B, an eighth embodiment reconfigurable cat litter box, generally referred to as 614, is there shown. Eighth embodiment reconfigurable cat litter box 614 (hereinafter referred to as "litter box 614") is similar to the third embodiment 290, except access ramp assembly 300 is integrally formed with base 20, so as to define another enclosure 615, by a suitable injection mold process, if a polymer is used, or by a suitable metal working process if a metal is used.

Figure 18C:
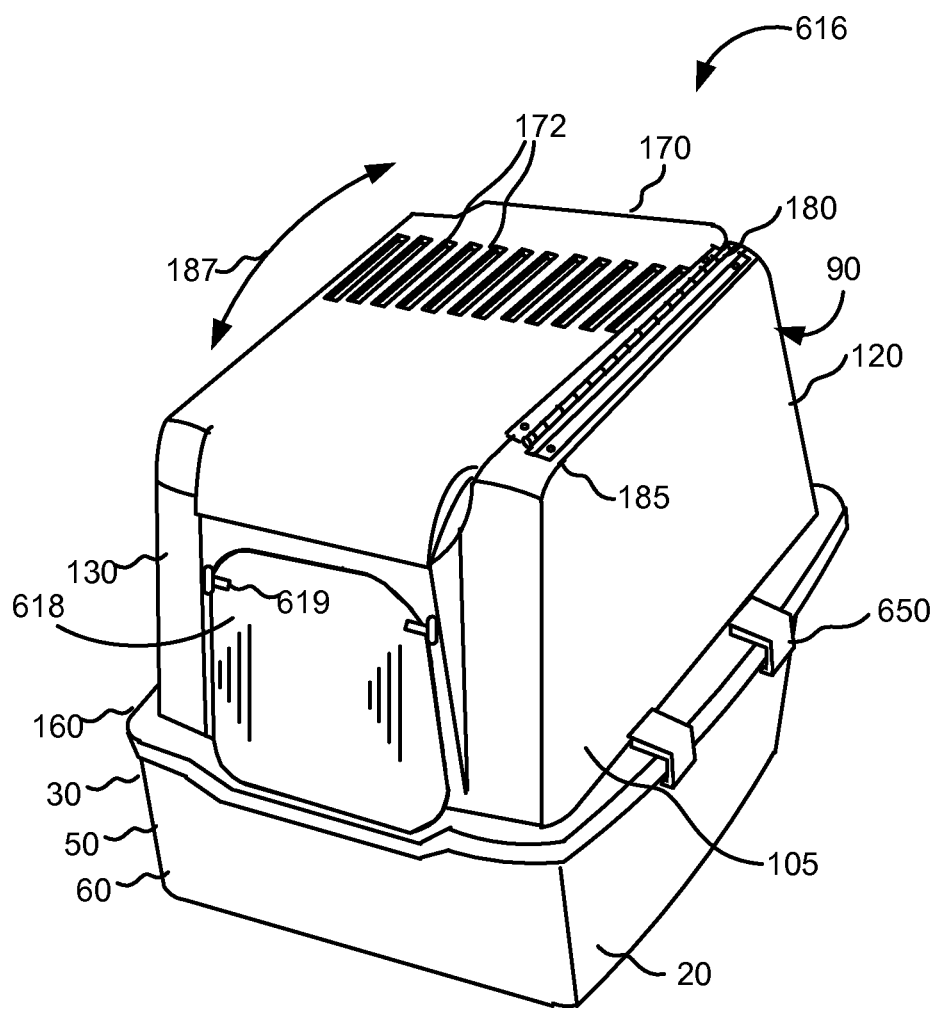
FIG. 18C is a view in perspective of a ninth embodiment reconfigurable cat litter box, this view showing a pivotable cat access door covering an access opening of the reconfigurable cat litter box, the pivotable access door being removable and reattached to either access opening.

In FIG. 18C, a ninth embodiment reconfigurable cat litter box, generally referred to as 616, is there shown. Ninth embodiment reconfigurable cat litter box 616 (hereinafter referred to as "litter box 616") is similar to the first embodiment 10, except a pivotable cat access door 618, that is mounted on a pair of pegs 619, covers access opening 150 for isolating the litter inside litter box 616 from the environment of the cat owner's living quarters. In this manner, cat litter 85 and waste clumps 87 are not visible, which may be more aesthetically desirable for some cat owners. In addition, presence of cat access door 618 reduces unpleasant odor emanating from waste matter in cat litter 85 by blocking odor that would otherwise escape through access opening 150. Further, presence of cat access door 618 reduces likelihood of litter scattering outside litter box 616 while cat 145 uses litter box 616.

Figure 18D:
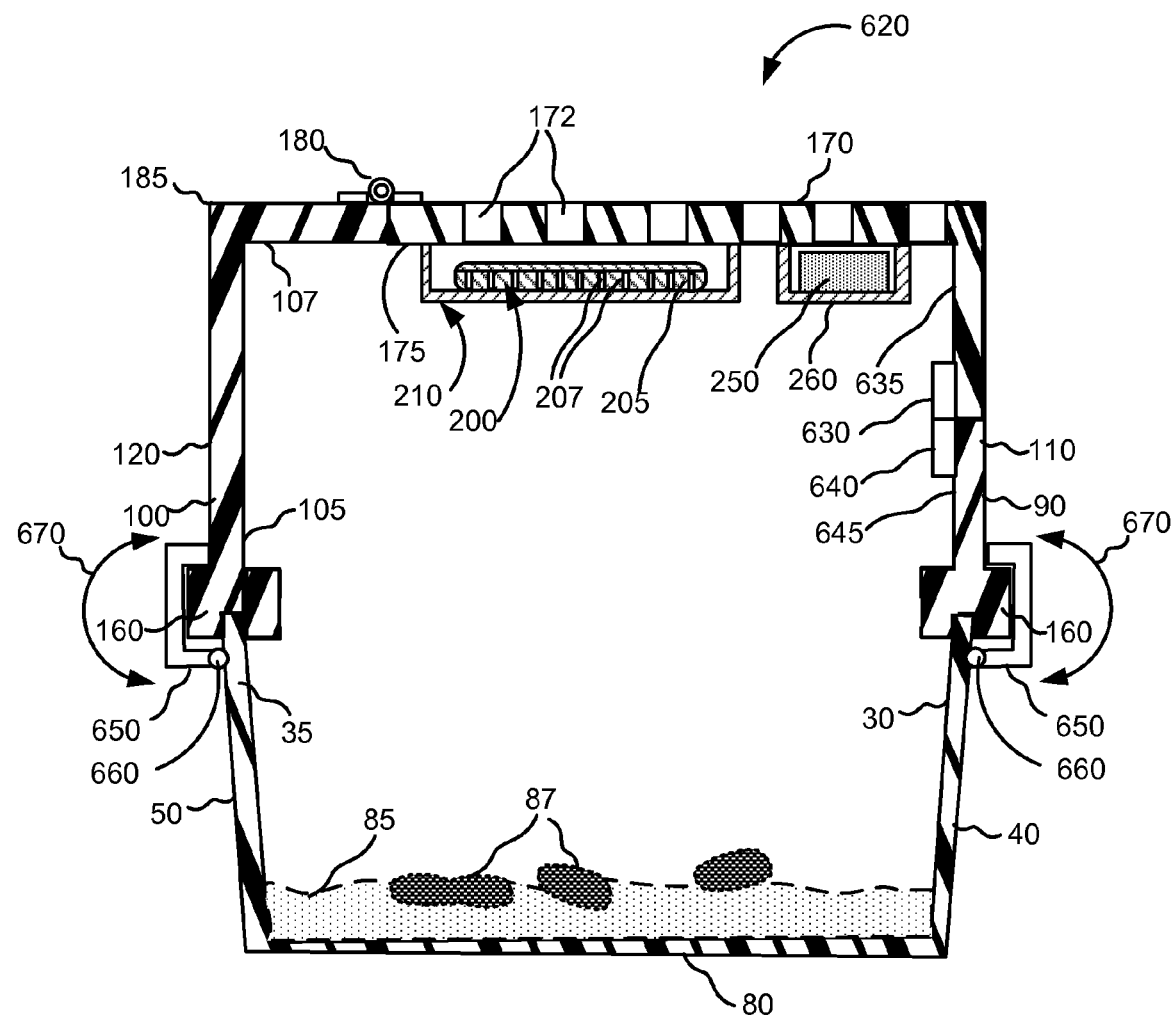
FIG. 18D is a view in vertical section of a tenth embodiment reconfigurable cat litter box, this view showing a plurality of magnets connecting the lid to the cover and a plurality of latches connecting the cover to the base, with at least one of the latches on one side of the cat litter box and at least one of the latches on the other side of the cat litter box.
Figure 18E:
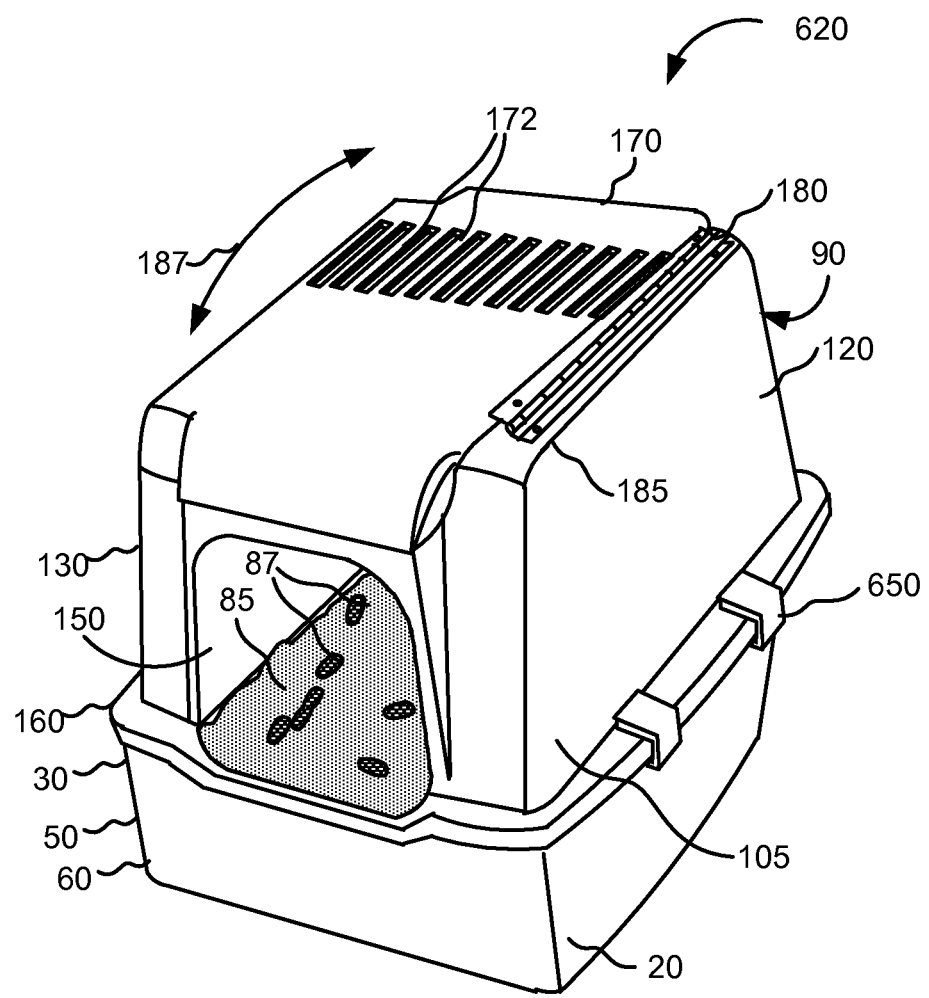
FIG. 18E is a view in perspective of the tenth embodiment reconfigurable cat litter box, this view showing the plurality of latches connecting the cover to the base on one side of the cat litter box.

In FIGS. 18D and 18E, a tenth embodiment reconfigurable cat litter box, generally referred to as 620, is there shown. Tenth embodiment reconfigurable cat litter box 620 (hereinafter referred to as "litter box 620") is similar to the first embodiment 10, except an internal upper magnet 630 is connected to an inside surface 635 of lid 170 and an internal lower magnet 640 is connected to an inside surface 645 of cover 170 and is disposed opposite upper magnet 630 for releasably securing lid 170 to cover 90 by means of magnetic force. In addition, a plurality of latches 650 are pivotably connected to an exterior of base 20, such as by means of pivot pins 660 that are attached to base 20. The pivot pins 660 allow each latche 650 to upwardly pivot about its respective pivot pin 660 in the direction of directional arrow 670, such that each latch 650 intimately engages flange 160 for connecting cover 90 to base 20. Pivot pins 660 also allow latches 650 to downwardly pivot in the direction of directional arrow 670, such that each latch 650 disengages flange 160 for disconnecting cover 90 from base 20. Rather than pivot pins 660, each latch 650 may be integrally, flexibly formed with base 20 so that each latch 650 can flex upwardly and downwardly in the direction of directional arrow 670. In this regard, latches 650 may be a flexible polymer (i.e., flexible plastic).

Figure 18F:
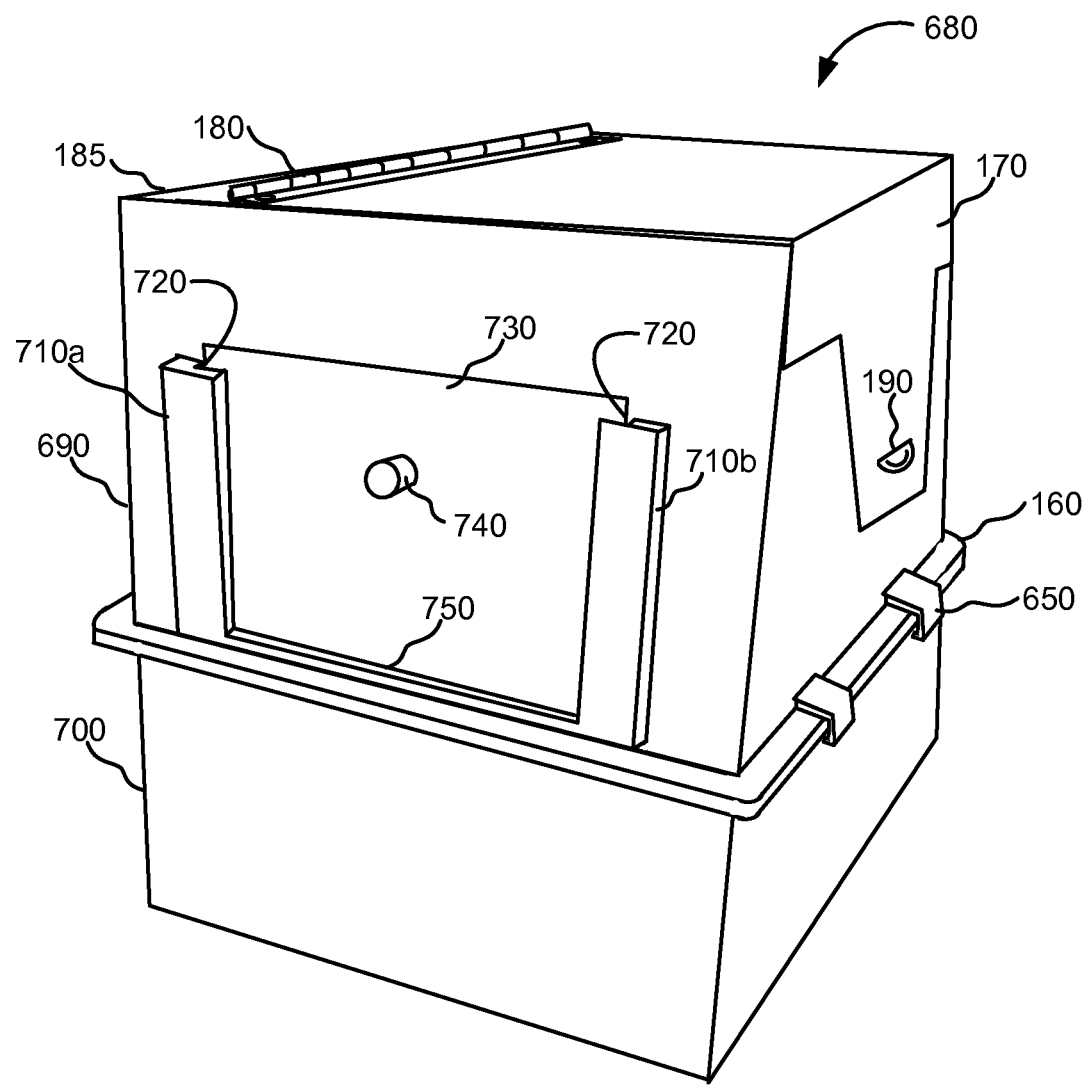
FIG. 18F is a view in perspective of an eleventh embodiment reconfigurable cat litter box, this view showing a pair of upright channels adjacent to an access opening for slidably receiving a removable blocking wall that blocks the access opening that is not used.
Figure 18G:
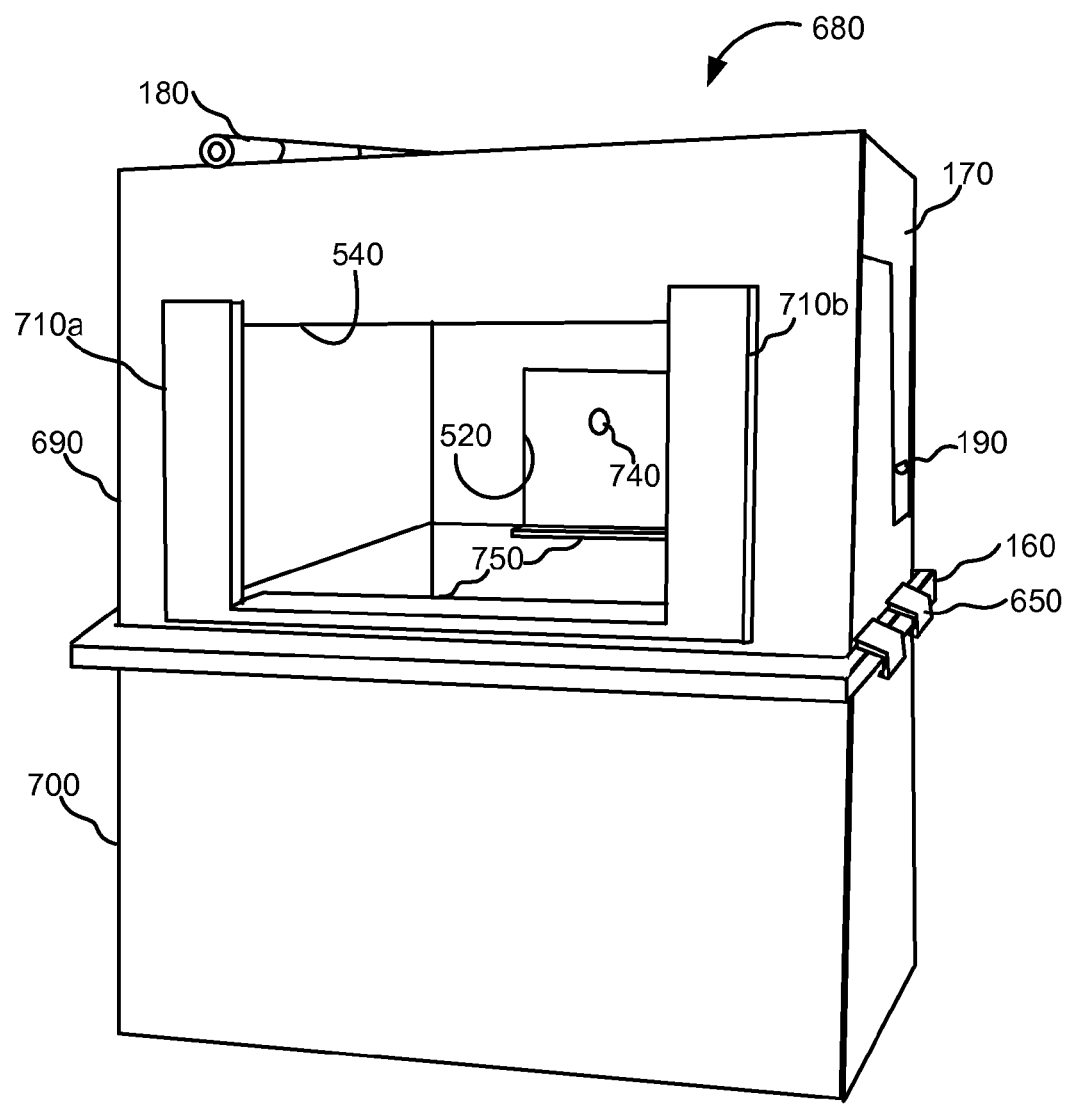
FIG. 18G is a view in perspective of the eleventh embodiment reconfigurable cat litter box with the blocking wall removed from the access opening.

In FIGS. 18F and 18G, an eleventh embodiment reconfigurable cat litter box, generally referred to as 680, is there shown. Eleventh embodiment reconfigurable cat litter box 680 (hereinafter referred to as "litter box 680") is similar to the fifth embodiment 490, except an alternative cover 690 is mountable on an alternative base 700. Alternative cover 690 is removably secured to alternative base 700 by means of previously mentioned flange 160 and latches 650. Alternative base 700 lacks the blocking panel 560 of litter box 490. Rather, a first pair of elongate, upright, and parallel channels 710a and 710b is coupled to alternative cover 690 and borders first access opening 520. Also, a second pair of identical, elongate, upright, and parallel channels (not shown) is coupled to alternative cover 690 and borders second access opening 540. Each elongate channel 710a/710b defines a groove or recess 720 longitudinally extending therealong for slidably receiving a blocking wall 730 for blocking or closing either first access opening 520 or second access opening 540, as desired. Blocking wall 730 includes a handle 740 for slidably inserting blocking wall 730 into recess 720 and for slidably removing blocking wall 730 from recess 720. A horizontal ledge 750 integrally formed with channels 710a/710b stops the downward travel of blocking wall 730 and thereafter allows blocking wall 730 to rest on ledge 750.

Referring again to FIGS. 18F and 18G, if a home or apartment wall 15a/15b or if furniture interferes with access to the first access opening, the cat owner or care giver slides blocking wall 730 along the first pair of channels, such that first access opening 520 is blocked by blocking wall 730. Blocking first access opening 520 in this manner discourages cat 145 from attempting to enter and exit litter box 680 through first access opening 620. Therefore, cat 145 will enter and exit litter box 680 through second access opening 540. Alternatively, if a home or apartment wall 15a/15b or if furniture interferes with access to second access opening 540, the cat owner or care giver slides blocking wall 730 along the second pair of channels, such that second access opening 540 is blocked by blocking wall 730. Blocking second access opening 540 in this manner discourages cat 145 from attempting to enter and exit cat litter box 680 through second access opening 540. Therefore, cat 145 will enter and exit litter box 680 through first access opening 520. Reconfiguring the cat litter box by means of blocking wall 730 allows litter box 680 to be disposed near virtually any wall, either perpendicularly, parallel, or at an angle with respect to the wall, and without a need to rearrange furniture or other items to accommodate presence of litter box 680.

It should be appreciated by a person of ordinary skill in the art cat box design and manufacture that some or all of the components belonging to the various embodiments of the reconfigurable cat litter box can be formed from a plastic composition, such as polypropylene, acrylonitrile butadiene styrene (ABS), nylon, acetone or resin using a suitable injection mold manufacturing process. Alternatively, some or all of the components belonging to the various embodiments of the reconfigurable cat litter box can be formed from a metallic composition, such as steel or aluminum, manufactured by a forging or metal-working operation during manufacture of the various embodiments of the reconfigurable cat litter box. Also, it should be appreciated that the embodiments disclosed herein are not necessarily mutually exclusive. For example, the one-way transparent viewing window 280 that is included in lid 170 of litter box 270 (see FIG. 5) can be used with litter box 470 (see FIG. 8), as well. As another example, access platform 580 of litter box 570 (see FIG. 18) can be used with litter box 10 (see FIG. 1). As a further example, blocking panel 560 of litter box 490 (FIG. 9) can be used with litter box 10 (see FIG. 1).

Illustrative Method:

An illustrative method associated with an exemplary embodiment for manufacturing the reconfigurable cat litter box according to the invention will now be described.

Figure 19:
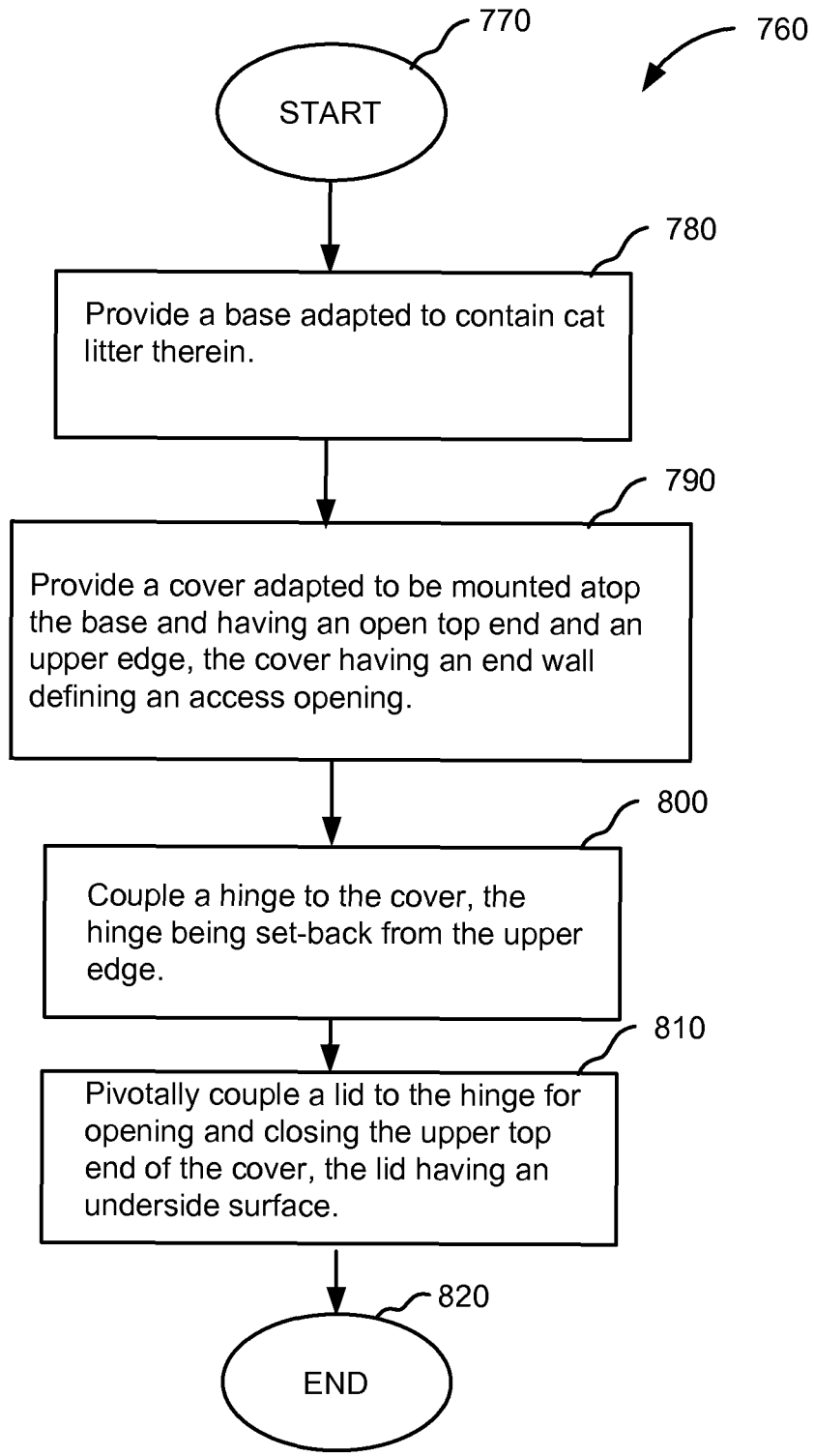
FIG. 19 is a flowchart showing an illustrative method of manufacturing a reconfigurable cat litter box.

Referring to FIG. 19, an illustrative method, generally referred to as 760, is provided for manufacturing a reconfigurable cat litter box. The method starts at a step 770. At a step 780, a base is provided that is adapted to contain cat litter therein. At a step 790, a cover is provided that is adapted to be mounted atop the base and having an open top end and an upper edge, the cover having an end wall defining an access opening. At a step 800, a hinge is coupled to the cover, the hinge being set-back from the upper edge. At a step 810, a lid is pivotally coupled to the hinge for opening and closing the upper top end of the cover, the lid having an underside surface. The method stops at a step 820.

Other modifications and implementations will occur to those skilled in the art without departing from the spirit and the scope of the invention as claimed. For example, each of the embodiments of the reconfigurable cat litter box can be enhanced by addition of a pathogen resistant, antimicrobial, antifungal composition added to the plastic composition comprising the embodiments of the reconfigurable cat litter box during manufacture of the embodiments of the reconfigurable cat litter box. In this regard, the material comprising the reconfigurable cat litter box may include a pathogen resistant, antimicrobial, antifungal composition, such as the "VINYZENE™ IT 3025 DOTP ANTIMICROBIAL" composition that may be available from The Dow Chemical Company located in Midland, Mich., U.S.A. The "VINYZENE™ IT 3025 DOTP ANTIMICROBIAL" composition comprises 2-n-octyl-4-isothiazolin-3-one in a nonvolatile phthalate-free carrier that can be added to the plastic composition comprising the reconfigurable litter box during manufacture of the reconfigurable cat litter box. Alternatively, when the reconfigurable cat litter box is made of metal, such as steel or aluminum, the metal may be coated, layered or otherwise painted with a pathogen resistant, antimicrobial, antifungal composition, such as a composition having silver (Ag) as an active ingredient. Such a commercially available coating containing silver and that is suitable for this purpose may be of a type, such as the "AGION" compound, that may be available from AgION® Technologies, Incorporated located in Wakefield, Mass., U.S.A. The "AGION" compound combines silver with an inorganic ceramic that permits a continuous, controlled release of ionic silver over an extended time period in such a manner that inhibits growth of microbes. Inhibiting growth of microbes, whether the reconfigurable cat litter box is formed of plastic or metal, is important in order to help maintain the reconfigurable cat litter box in a sanitary condition, so that risk to human health is reduced. Accordingly, the description hereinabove is not intended to limit the invention, except as indicated in the following claims.

The claims will be interpreted according to law. However, and notwithstanding the alleged or perceived ease or difficulty of interpreting any claim or portion thereof, under no circumstances may any adjustment or amendment of a claim or any portion thereof during prosecution of the application or applications leading to this patent be interpreted as having forfeited any right to any and all equivalents thereof that do not form a part of the prior art.

All of the features disclosed in this specification may be combined in any combination. Thus, unless expressly stated otherwise, each feature disclosed is only an example of a generic series of equivalent or similar features.

It is to be understood that while the invention has been described in conjunction with the detailed description thereof, the foregoing description is intended to illustrate and not limit the scope of the invention, which is defined by the scope of the appended claims. Thus, from the foregoing, it will be appreciated that, although specific embodiments of the invention have been described herein for the purpose of illustration, various modifications may be made without deviating from the spirit and scope of the invention. Other aspects, advantages, and modifications are within the scope of the following claims and the present invention is not limited except as by the appended claims.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. The invention illustratively described herein suitably may be practiced in the absence of any element or elements, or limitation or limitations, which is not specifically disclosed herein as essential. Thus, for example, in each instance herein, in embodiments or examples of the present invention, the terms "comprising", "including", "containing", etc. are to be read expansively and without limitation. The methods and processes illustratively described herein suitably may be practiced in differing orders of steps, and that they are not necessarily restricted to the orders of steps indicated herein or in the claims.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by various embodiments and/or preferred embodiments and optional features, any and all modifications and variations of the concepts herein disclosed that may be resorted to by those skilled in the art are considered to be within the scope of this invention as defined by the appended claims.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

It is also to be understood that as used herein and in the appended claims, the singular forms "a," "an," and "the" include plural reference unless the context clearly dictates otherwise, the term "X and/or Y" means "X" or "Y" or both "X" and "Y", and the letter "s" following a noun designates both the plural and singular forms of that noun. In addition, where features or aspects of the invention are described in terms of Markush groups, it is intended and those skilled in the art will recognize, that the invention embraces and is also thereby described in terms of any individual member or subgroup of members of the Markush group.

Other embodiments are within the following claims. The patent may not be interpreted to be limited to the specific examples or embodiments or methods specifically and/or expressly disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicant(s).

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A cat litter box having a reconfigurable animal ingress/egress, including:
   a base adapted to contain cat litter therein, the base having an open top and a blocking panel formed integrally at one end of the base; and
   a cover, having an open bottom and a closeable top, adapted to be mounted atop the base, the cover including:
     a lid, hingedly coupled along, and proximate to, an upper edge of the cover, the lid for closing the closeable top to form an enclosed interior with the base, the lid having an underside surface that is exposed to the interior when closed;
     a first end wall defining a first access opening, and
     a second end wall defining a second access opening,
   wherein each of the first and second access openings are capable of receiving the blocking panel when the cover is mounted atop the base, depending upon the orientation of the base with respect to the orientation of the cover, the blocking panel for constraining location of animal ingress/egress to whichever of the first and second openings is not currently receiving the blocking panel, and
   whereby reconfiguration of the ingress/egress location can be performed by unmounting the cover, rotating the orientation of the base with respect to the orientation of the cover, and remounting the cover atop the base.

2. The cat litter box of claim 1, further including a litter scoop holder coupled to the underside surface of the lid.

3. The cat litter box of claim 1, wherein the lid defines a vent therethrough.

4. The cat litter box of claim 3, further including a deodorizer support coupled to the underside surface and aligned with the vent.

5. The cat litter box of claim 1, further including an access platform adapted to be disposed adjacent to whichever of the first or second access openings is currently configured to provide animal ingress/egress.

6. The cat litter box of claim 1, further including an access ramp assembly adapted to be disposed adjacent to whichever of the first or second access openings is currently configured to provide animal ingress/egress.

7. The cat litter box of claim 1, wherein the lid is hingedly coupled at a location that is set back from the upper edge and is substantially perpendicular to a plane containing the first and second openings.

8. The cat litter box of claim 1, wherein the blocking panel is formed integrally with the base.

* * * * *